US012075788B2

(12) United States Patent
Roostaee et al.

(10) Patent No.: US 12,075,788 B2
(45) Date of Patent: Sep. 3, 2024

(54) ANTIMICROBIAL NANO-EMULSION

(71) Applicant: Laboratoire M2, Sherbrooke (CA)

(72) Inventors: Alireza Roostaee, Sherbrooke (CA); Frédéric Picard-Jean, Sherbrooke (CA)

(73) Assignee: Laboratoire M2, Canton de Hatley (CA)

( * ) Notice: Subject to any disclaimer, the term of this patent is extended or adjusted under 35 U.S.C. 154(b) by 215 days.

(21) Appl. No.: 17/265,734

(22) PCT Filed: Mar. 26, 2020

(86) PCT No.: PCT/CA2020/050397
§ 371 (c)(1),
(2) Date: Feb. 3, 2021

(87) PCT Pub. No.: WO2020/198853
PCT Pub. Date: Oct. 8, 2020

(65) Prior Publication Data
US 2022/0322681 A1 Oct. 13, 2022

Related U.S. Application Data

(60) Provisional application No. 62/825,927, filed on Mar. 29, 2019.

(51) Int. Cl.
| | | |
|---|---|---|
| *A01N 65/22* | (2009.01) | |
| *A01N 25/04* | (2006.01) | |
| *A01N 25/30* | (2006.01) | |
| *A01N 27/00* | (2006.01) | |
| *A01N 31/08* | (2006.01) | |
| *A01N 43/08* | (2006.01) | |
| *A01N 65/08* | (2009.01) | |
| *A01P 1/00* | (2006.01) | |

(52) U.S. Cl.
CPC ............ *A01N 65/22* (2013.01); *A01N 25/04* (2013.01); *A01N 25/30* (2013.01); *A01N 27/00* (2013.01); *A01N 31/08* (2013.01); *A01N 43/08* (2013.01); *A01N 65/08* (2013.01); *A01P 1/00* (2021.08)

(58) Field of Classification Search
None
See application file for complete search history.

(56) References Cited

U.S. PATENT DOCUMENTS

| 6,733,802 B1 | 5/2004 | Moorty et al. |
| 2010/0303940 A1 | 12/2010 | Enan |
| 2014/0242199 A1 | 8/2014 | Manhas et al. |

FOREIGN PATENT DOCUMENTS

| CN | 101720773 | 6/2010 |
| CN | 101720773 A | 6/2010 |
| CN | 101926337 | 12/2010 |
| EP | 2359702 | 8/2011 |
| EP | 2721933 | 4/2014 |
| WO | WO2011089249 A1 | 7/2011 |

OTHER PUBLICATIONS

Deng et al. "Phase Behavior, Microstructural transition, antimicrobial and Antioxidant Activities of a Water-Dilutable Thymol Microemulsion".
Ozogul et al. "Evolution of Effects of nanoemulsion Based on Herb essential Oils(rosemary, laurel, thyme and sage) on Sensory, Chemical and Microbiological Quality of Rainbow Trout (*Oncorhynchus mykiss*) Fillets During Ice Storage", LWT—Food Science and Technology, 2017, vol. 75, pp. 677-684.
Linares et al. "Enhancing Rosemary oil-inwater Microfluidized Nanoemulsion Properties Through Formulation Optimization by Response Surface Methodology", LWT—Food Science and Technology, 2018, vol. 97, pp. 370-375.
Santiesteban-Lopez et al."Susceptibility of Food-Borne Bacteria to Binary Combinations of Antimicrobials at Selected a w and pH", Journal of Applied Microbiology, 2007, vol. 102, pp. 486-497.
Kallio et al. "Vitamin C Inhibits *Staphylococcus aureus* Growth and Enhances the Inhibitory Effect of Quercetin on Growth of *Escherichia coli* In Vitro", Planta Med., 2012, vol. 78, No. 17, pp. 1824-1830.
Supplementary European Search Report of Corresponding European Application No. 20783786.5; Munich, Maxwell Davies; Jun. 3, 2022.
English Abstract of CN101720773, Jun. 9, 2010.
Kumari S. et al.; "Thymol nanoemulsion exhibits potential antibacterial activity against bacterial pustule disease and 1 growth promotory effect on soybean".
International Search Report; WO2020198853; Jun. 17, 2020; Black, Daniel.

*Primary Examiner* — Michael V Meller
(74) *Attorney, Agent, or Firm* — BENOIT & COTE INC.; Mathieu Miron

(57) ABSTRACT

The present document describes an aqueous nano-emulsion formulation comprising an oil, a solvent a sorbate, a saponin, in an amount sufficient to form a nano-emulsion of said oil in water and sufficient water to make 100 weight percent. The document also describes the use of the nano-emulsion formulation as disinfectant, pesticides and/or plant growth regulator.

2 Claims, 16 Drawing Sheets

Before Treatment

Post-Treatment

Before Treatment　　　　　　　Post-Treatment

Before Treatment　　　　　　　Post-Treatment

ANTIMICROBIAL NANO-EMULSION

CROSS-REFERENCE TO RELATED APPLICATIONS

This application is a U.S. National Phase application under 35 U.S.C. § 371 of PCT/CA2020/050397, filed Mar. 26, 2020, which claims priority from and the benefit of U.S. Provisional Pat. Application No. 62/825,927 filed on Mar. 29, 2019, the specifications of which are hereby incorporated by reference in their entireties.

BACKGROUND

(a) Field

The subject matter disclosed generally relates to natural anti-microbial and anti-fungicidal nano-emulsion formulations, and uses thereof. More specifically, the subject matter disclosed relates to disinfectant and pesticide formulations comprising thyme oil, solvent, sorbate, saponins and water.

(b) Related Prior Art

Most plant disinfectants or pesticides are potentially harmful or toxic to humans, animals and plants. Modern disinfectants, pesticides or anti-microbials often contain an organic phenolic compound as the active disinfecting ingredient. Other ingredients are usually high concentrations of a solvent and a surfactant. When used in higher concentrations, the presence of a particular solvent and surfactant can synergistically increase the negative side effects of the surfactants and consequently, the negative side effects, and potentially the toxicity of the disinfectant itself.

The present invention minimizes the toxicity risk of plant disinfectants, pesticides or anti-microbials to humans and plants by using thyme oil and provide optimal alternatives to highly synthetic and toxic anti-microbial and antifungal agents in use in the agricultural industry. Traditional agents have disadvantageous aspects, such as the need for worker protection, limitations on the quantity of use and efficacy, as well as pollution of the environment, causing significant costs and problems to remediate. Certain synthetic surfactants are contributors to such problems. Therefore, there is a need for alternative emulsifying agents in a nano-emulsion system of natural oils or essential oil that would not also negate the nature and advantages of the other natural constituents.

The present invention also provides several other advantages as compared to alternatives currently available.

While the use of essential oils (EO) as anti-microbials/fungal is well-known, the cost of EO for use in industrial agriculture makes them cost prohibitive. The present invention provides a natural and cost-effective solution to the inherently high costs of EOs by using sorbate, a generally recognized as safe (GRAS) ingredient, which is relatively inexpensive, and amplifies the efficacy of thymol's antimicrobial properties, via the formation of smaller micelles in the nano-emulsions. The net effect is an extremely powerful anti-microbial, which can rely on relatively little EO.

The invention produces a size of nano-emulsion which is relatively impervious to gravitational sedimentation or creaming. This means that on site mixing, agitating or handling of the invention is not needed even after dilution.

Lastly, losses attributable to disease is the most significant detriment to agricultural productivity. Effectiveness in reducing crop losses through disease control is essential to the agricultural industry. The use of sorbates, such as potassium sorbate in the system results in a synergy in terms of anti-microbial effect. It is known that potassium sorbate, itself, is an effective anti-microbial. It is often referred to as a cell membrane interrupter, which is believed to be the mechanism of action, because of its ability to weaken the cell membranes of pathogens. Similarly, thymol, possesses antimicrobial properties which have the same mechanism of action on the cell membrane. Together, potassium sorbate weakens the cell membrane and enhances thymol's ability to partition the lipid constituents of the membrane and more rapidly produce cytoplasmic leakage, and pathogenic cell death. This produces a much higher rate of pathogenic killing, which, in turn, reduces disease, and increases crop yield.

SUMMARY

According to an embodiment, there is provided an aqueous nano-emulsion formulation comprising:
  a) from about 0.05% to about 55% weight of an oil;
  b) from about 0.04% to about 65% weight of a solvent;
  c) from about 0.01% to about 25% of a sorbate;
  d) from about 0.00025% to about 0.37% weight of a saponin, in an amount sufficient to form a nano-emulsion of the oil in water;
  e) sufficient water to make 100 weight percent.

The oil may be an essential oil, or an active ingredient thereof.

The essential oil may be an antimicrobial essential oil, an antibacterial essential oil, a disinfectant essential oil, a pesticidal essential oil, or a combination thereof.

The essential oil may be any one of oil of anise, lemon oil, orange oil, oregano oil, rosemary oil, wintergreen oil, thyme oil, lavender oil, clove oil, hops oil, tea tree oil, citronella oil, wheat oil, barley oil, lemongrass oil, cedar leaf oil, cedar wood oil, cinnamon oil, fleagrass oil, geranium oil, sandalwood oil, violet oil, cranberry oil, eucalyptus oil, vervain oil, peppermint oil, basil oil, fennel oil, fir oil, balsam oil, ocmea origanum oil, Hydastis carradensis oil, Berberidaceae daceae oil, Ratanhiae oil, *Curcuma Longa* oil, sesame oil, macadamia nut oil, evening primrose oil, coriander oil, pimento berries oil, rose oil, bergamot oil, rosewood oil, chamomile oil, sage oil, clary sage oil, cypress oil, sea fennel oil, frankincense oil, ginger oil, grapefruit oil, jasmine oil, juniper oil, lime oil, mandarin oil, marjoram oil, myrrh oil, neroli oil, patchouli oil, pepper oil, black pepper oil, petitgrain oil, pine oil, rose otto oil, spearmint oil, spikenard oil, vetiver oil, a conifer essential oil, ylang ylang, or combinations thereof.

The essential oil may be thyme oil.

The essential oil may be rosemary oil.

The active ingredient may be thymol, carvacrol, cinnamaldehyde, citral, menthol, geraniol, capsaicin, paracymene or combinations thereof.

The oil may be neem oil, cottonseed oil, and a combination thereof.

The aqueous nano-emulsion formulation may further comprise from about 0.0002% to about 0.3% weight of a pH adjusting agent.

The thyme oil may be of natural origin, of synthetic origin, or a combination thereof.

The rosemary oil may be of natural origin, of synthetic origin, or a combination thereof.

The solvent may be at least one of 1,2-dichloroethane, 2-butanone, acetone, acetonitrile, benzene, carbon tetrachloride, chloroform, cyclohexane, hexane, pentane, tetrahydrofuran, 1,1-dichloroethane, 1,2-dichloroethane, 1-butanol, 1-heptanol, 1-hexanol, 1-octanol, 1-pentanol, 1-propanol, 2-aminoethanol, 2-butanol, 2-butanone, 2-pentanol, 2-pentanone, 2-propanol, 3-pentanol, 3-pentanone, acetic acid, acetone, acetonitrile, acetyl acetone, aniline, anisole, benzene, benzonitrile, benzyl alcohol, butyl acetate, Butyl lactate, carbon disulfide, carbon tetrachloride, chlorobenzene, chloroform, cyclohexane, cyclohexanol, cyclohexanone, dichloromethane, diethyl ether, diethylamine, diethylene glycol, diglyme, diisopropyl ether, dimethoxyethane, dimethylformamide, dimethylphthalate, dimethylsulfoxide, di-n-butylphthalate, dioxane, ethanol, ether, ethyl acetate, ethyl acetoacetate, ethyl benzoate, ethylene glycol, glycerol, heptane, hexane, i-butanol, isopropanol, methanol, methyl acetate, methyl t-butyl ether, methylene chloride, methyl-t-butyl ether, N,N-dimethylaniline, pentane, p-xylene, pyridine, t-butyl alcohol, tetrahydrofuran, toluene, trichloroethylene, water, heavy water, and xylene.

The at least one solvent may be at least two solvents, at least three solvents, at least four solvents, or at least five solvents.

The at least one solvent may be at least three solvents.

The at least three solvents may comprise isopropanol, glycerol, and butyl lactate.

The sorbate may be potassium sorbate, sodium sorbate, calcium sorbate, sorbic acid, or combinations thereof.

The sorbate may be potassium sorbate.

The saponin may be provided by a vegetal extract.

The vegetal extract may be a *Quillaja saponaria* extract, a *Yucca schidigera* extract, a horse chestnut extract, a tea seed extract, a soybean extract, and combinations thereof.

The vegetal extract may be a *Quillaja saponaria* extract.

The aqueous nano-emulsion formulation comprises from about 0.004 to about 0.5% weight of the *Quillaja saponaria* extract.

The pH adjusting agent may be at least one of citric acid, lactic acid, hydrochloric acid, boric acid, acetic acid, sodium hydroxide, potassium hydroxide, sulfuric acid, calcium carbonate ($CaCO_3$), ammonium carbonate, ammonium bicarbonate, ammonium citrate, sodium citrate, magnesium carbonate, sodium carbonate, mono, di and/or trisodium phosphate, mono, di and/or tripotassium phosphate, Tris (hydroxymethyl) aminomethane (TRIS), amino acids and zwitterions, such as glycine, 2-amino-2methyl-1,3-propane-diol (AMPD), N-(1,1-Dimethyl-2-hydroxyethyl)-3-amino-2-hydroxypropanesulfonic acid (AMPSO), N-Glycylglycine (Gly-Gly), 4-(2-hydroxyethyl)piperazine-1-propanesulfonic acid (EPPS or HEPPS), 3-(cyclohexylamino)-1-propane-sulfonic acid (CAPS), 3-(cyclohexylamino)-2-hydroxy-1-propanesulfonic acid (CAPSO), 2-(cyclohexylamino)ethanesulfonic acid (CHES), N,N-bis[2-hydroxyethyl]-2-aminoethanesulphonic acid (BES), (2-[2-hydroxy-1,1-bis (hydroxymethyl)ethylamino]ethanesulphonic acid) (TES), 2-(N-morpholino)ethanesulfonic acid (MES), N-[Tris(hydroxymethyl)methyl]glycine (Tricine); N-Tris(hydroxymethyl)methyl-3-aminopropanesulfonic acid (TAPS) and 3-N-Morpholino propanesulfonic acid (MOPS), piperazie-N,N'-bis[2-hydroxypropanesulphonic]acid (POPSO), and combinations thereof.

The pH adjusting agent may be at least citric acid.

The aqueous nano-emulsion formulation may further comprise vitamin C.

The aqueous nano-emulsion formulation may comprise from about 0.002 to about 5% weight of the vitamin C.

The aqueous nano-emulsion formulation may comprise:
a) from about 0.05% to about 55% weight of oil;
b) from about 0.005% to about 7.5% weight of isopropanol;
c) from about 0.02% to about 30% weight of glycerol;
d) from about 0.02% to about 27% weight of butyl lactate;
e) from about 0.01% to about 25% of potassium sorbate;
f) from about 0.0004% to about 0.5% weight of a *Quillaja saponaria* extract, in an amount sufficient to form a nano-emulsion of the oil in water;
g) from about 0.0002% to about 0.3% weight of citric acid;
h) sufficient water to make 100 weight percent.

According to another embodiment, the aqueous nano-emulsion formulation of the present invention comprises no additional surfactant.

The pH may be ranging from about 6 to about 9.

According to another embodiment, the aqueous nano-emulsion formulation may be further comprising a surfactant or a further emulsifying agent.

According to another embodiment, the aqueous nano-emulsion formulation of comprises no additional disinfectant, pesticide or sanitizers.

According to an embodiment, the aqueous nano-emulsion formulation of the present invention is for use as a disinfectant formulation.

According to an embodiment, the aqueous nano-emulsion formulation of the present invention is for use as a pesticidal formulation from control of a pest.

According to an embodiment, the aqueous nano-emulsion formulation of the present invention is for use in regulating growth of a seed or a plant.

The aqueous nano-emulsion formulation may be further comprising a further pesticide, a fertilizer, a defoamer, a plant growth regulator, or combinations thereof.

The further pesticide may be chosen from an algicide, an antifouling agent, a disinfectant, a fungicide, a fumigant, an herbicide, a molluscicide, an ovicide, a rodenticide, an insect growth a bactericide, a virucide, an insect repellent, an arthropod repellent, a nematicide, an insecticide, an acaricide, an herbicide, and a plant growth regulator.

The fertilizer may be chosen from fertilizers an inorganic fertilizer, a nitrogen fertilizer, a potassium fertilizer, a phosphate fertilizer, an organic fertilizer, a manure, a compost, a rock phosphate, a bone meal, an alfalfa, a wood chip, a langbeinite, a cover crops, potassium sulfate, a rock powder, ash, a blood meal, a fish meal, a fish emulsion, an algae, a chitosan and a molasse.

The defoamer may be chosen from a mineral oil, a vegetable oil, a paraffin wax, an ester wax, a silica, a fatty alcohol, a silicone, a polyethylene glycol, a polypropylene glycol, copolymer, and an alkyl polyacrylate.

The plant growth regulator may be chosen from a carbamate, a chlorinated hydrocarbon, cyclohexadione, an organic acid, ancymidol, ethephon, gibberelic acid, gibberellins and benazladenine, maleic hydrazide, NAA, napthalene acetamide, paclobutrazol, N-acetylaspartic acid.

According to another embodiment, there is provided a method of using the aqueous nano-emulsion formulation of the present invention, comprising the step of diluting the aqueous nano-emulsion formulation with water.

According to another embodiment, there is provided a method of disinfecting a surface comprising applying the aqueous nano-emulsion formulation of the present invention to a surface in need of disinfecting.

According to another embodiment, there is provided a method for the control of a pest of a soil, a seed or a plant, the method comprising contacting the seed or plant with a pesticidal amount of the aqueous nano-emulsion formulation of the present invention.

In the aqueous nano-emulsion formulation of the present invention, or the method of the present invention, wherein the pest may be chosen from an insect, a nematode, a fungi, a bacteria, a larvae, a plant, an animal, a virus, a parasite, a gastropod, an arthropod, a snail, a slug, an algae, or combinations thereof.

In the aqueous nano-emulsion formulation of the present invention, or the method of the present invention, wherein the pest may be fireblight, powdery mildew, septoria and *botrytis*.

The plant may be a weed.
The arthropod may be a mite.
The insect may be a moth.

According to another embodiment, there is provided a method for regulating growth of a seed or a plant, the method comprising contacting the seed or plant with a growth regulating amount of the aqueous disinfectant formulation of the present invention.

The regulating growth may comprise an increase in the number of fruits, vegetables, bulbs or tubers from the plant.

The regulating the growth may comprise an increase in the size of fruit, vegetable, bulb or tuber from the plant.

The regulating the growth may comprise an increase in the number of healthy plants.

The plant may be chosen from a banana plant, an apple tree, a pear tree, a potato plant, a rice plant, a coffea plant, a citrus tree, an onion, ginseng, soy, a weed, a tomato plant.

The following terms are defined below.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that can or cannot be utilized in a particular embodiment of the present invention.

For the purposes of describing and defining the present invention it is noted that the term "substantially" is utilized herein to represent the inherent degree of uncertainty that can be attributed to any quantitative comparison, value, measurement, or other representation. The term "substantially" is also utilized herein to represent the degree by which a quantitative representation can vary from a stated reference without resulting in a change in the basic function of the subject matter at issue.

The term "formulation" as used herein is intended to encompass a product comprising the specified ingredients in the specified amounts, as well as any product which results, directly or indirectly, from combination of the specified ingredients in the specified amounts. Further the formulation refers to the mixture wherein the substances in the mixture do not react with each other but have desirable properties as a mixture. Such term in relation to pharmaceutical composition is intended to encompass any composition made by admixing the formulation of the present invention and a pharmaceutically acceptable carrier. By "pharmaceutically acceptable" or "acceptable" it is meant the carrier, diluent or excipient must be compatible with the other ingredients of the formulation and not deleterious to the recipient thereof.

Weight percent, percent by weight, % by weight, wt %, and the like are synonyms that refer to the concentration of a substance as the weight of that substance divided by the weight of the composition and multiplied by 100.

The term "disinfectant" as used herein refers to an antimicrobial agent that on application destroys or reduces the growth of microorganisms living on the surface of the object on which it is applied.

The term "antimicrobial" as used herein refers to an agent that kills microorganisms or stops their growth.

The term "pesticide" as used herein refers to substances that are meant to control pests, including weeds. The term pesticide includes all of the following: herbicide, insecticides (which may include insect growth regulators, termiticides, etc.) nematicide, molluscicide, piscicide, avicide, rodenticide, bactericide, insect repellent, animal repellent, antimicrobial, fungicide and disinfectant (antimicrobial). The most common of these are herbicides which account for approximately 80% of all pesticide use. Most pesticides are intended to serve as plant protection products (also known as crop protection products), which in general, protect plants from weeds, fungi, or insects.

The term "biopesticide" as used herein refers to the contraction of "biological pesticides" and refers to certain types of pesticides derived from such natural materials as animals, plants, bacteria, and certain minerals.

The term "antiseptic" as used herein refers to antimicrobial substances that are applied to any surfaces, such as floors, walls, ceilings, as well as living tissues to reduce the possibility of microbial contamination, including infection, sepsis, or putrefaction.

The term "natural origin" as used herein refers to phenolic compounds and saponins that exist or are produced in nature. Such phenolic compounds and saponins can be extracted or isolated from their natural environment by any suitable means. Of course, such phenolic compounds and saponins can also be synthetically produced by the hand of man. Such synthetic equivalents are within the definition of "natural origin".

The term "micelles" as used herein refers to aggregates formed by amphiphilic molecules when suspended in an aqueous solution. The length of the non-polar tail of a detergent, the nature and size of the polar or ionic head of a detergent, the quantity and type of saponins, the acidity of the solution, the temperature, and the presence of added salts are the most important factors determining the shape and size of micelles obtained. Micelles are widely used in the industrial and biological field for their ability to dissolve and carry on polar substances through an aqueous medium. The carrying ability of micelles is largely dependent on their size and shape.

The term "nano-emulsion" as used herein refers to oil-in-water (o/w) emulsions with mean droplet diameters ranging from about 10 to about 1000 nm, or about 20 to about 1000 nm, or about 30 to about 1000 nm, or about 40 to about 1000 nm, or about 50 to about 1000 nm, and often with mean droplet size between about 10 to about 500 nm, or about 20 to about 500 nm, or about 30 to about 500 nm, or about 40 to about 500 nm, or about 50 to about 500 nm, or about 100 to about 500 nm or about 70 to about 300 nm, or about 50 to about 300 nm, or about 10 to about 200 nm, or about 20 to about 200 nm, or about 30 to about 200 nm, or about 40 to about 200 nm, or about 50 to about 200 nm, or about 60 to about 200 nm, or about 70 to about 200 nm, or about 80 to about 200 nm, or about 90 to about 200 nm, or about 100 to about 200 nm, or about 125 to about 200 nm, or about 150 to about 200 nm, or about 175 to about 200 nm, or about 10 to about 175 nm, or about 20 to about 175 nm, or about 30 to about 175 nm, or about 40 to about 175 nm, or about 50 to about 175 nm, or about 60 to about 175 nm, or about 70 to about 175 nm, or about 80 to about 175 nm, or about 90 to about 175 nm, or about 100 to about 175 nm, or about 125 to about 175 nm, or about 150 to about 175 nm, or about 10 to about 150 nm, or about 20 to about 150 nm, or about 30 to about 150 nm, or about 40 to about 150 nm, or about 50 to about 150 nm, or about 60 to about 150 nm, or about 70 to about 150 nm, or about 80 to about 150 nm, or about 90 to about 150 nm, or about 100 to about 150 nm, or about 125 to about 150 nm, or about 10 to about 125 nm, or about 20 to about 125 nm, or about 30 to about 125 nm, or about 40 to about 125 nm, or about 50 to about 125 nm, or about 60 to about 125 nm, or about 70 to about 125 nm, or about 80 to about 125 nm, or about 90 to about 125 nm, or about 100 to about 125 nm, or about 10 to about 100 nm, or about 20 to about 100 nm, or about 30 to about 100 nm, or about 40 to about 100 nm, or about 50 to about 100 nm, or about 60 to about 100 nm, or about 70 to about 100 nm, or about 80 to about 100 nm, or about 90 to about 100 nm, or about 10 to about 90 nm, or about 20 to about 90 nm, or about 30 to about 90 nm, or about 40 to about 90 nm, or about 50 to about 90 nm, or about 60 to about 90 nm, or about 70 to about 90 nm, or about 80 to about 90 nm, or about 10 to about 80 nm, or about 20 to about 80 nm, or about 30 to about 80 nm, or about 40 to about 80 nm, or about 50 to about 80 nm, or about 60 to about 80 nm, or about 70 to about 80 nm, or about 10 to about 70 nm, or about 20 to about 70 nm, or about 30 to about 70 nm, or about 40 to about 70 nm, or about 50 to about 70 nm, or about 60 to about 70 nm, or about 10 to about 60 nm, or about 20 to about 60 nm, or about 30 to about 60 nm, or about 40 to about 60 nm, or about 50 to about 60 nm, or about 10 to about 50 nm, or about 20 to about 50 nm, or about 30 to about 50 nm, or about 40 to about 50 nm, or about 10 to about 40 nm, or about 20 to about 40 nm, or about 30 to about 40 nm, or about 10 to about 30 nm, or about 20 to about 30 nm, or about 10 to about 20 nm.

The term "pathogen" is intended to mean an agent that can produce disease. A pathogen may also be referred to as an infectious agent, or simply a germ. Typically, the term is used to describe an infectious microorganism or agent, such as a virus, bacterium, protozoan, prion, viroid, or fungus, gastropods, arthropods, snails, slugs, algae. Small animals, such as certain kinds of worms and insect larvae, and vertebrates (mammal and birds), can also produce disease. However, these animals are usually, in common parlance, referred to as parasites rather than pathogens.

The terms "regulating plant growth" and "growth regulation amount" are intended to mean that the method and composition of the present invention regulate at least one aspect of the growth of a plant. The regulation of growth does not need to be on all aspects of plant growth. For example, the composition of the present invention may regulate the growth of any one of the foliage, leaves, flowers, stems, branches, fruits, vegetables, bulb, tubers, or any other part of the plant, independently from other parts of the plant. As used herein, the term "growth regulating amount" is intended to mean an amount of the composition of the present invention that causes at least one of the aspects of the growth of a plant to be regulated as defined above. The regulation of plant growth may also include an overall increase on the growth of a plant. The regulation of plant growth may also show as an increase in the number of healthy plants in a culture of plants comprising several individuals. The regulation of plant growth may also include stimulation of fruit ripening. The regulation of plant growth may also include inhibition of plant growth and shoot growth. The regulation of plant growth may also include an increase in flowering. The regulation of plant growth may also include the regulation of leaf and fruit senescence. The growth regulating amount may span a range of concentration over which the effect may be observed, and each growth regulating effects may be observed at the detriment of the growth of other parts of the plant. Preferably, the growth regulating effect may be obtained without any phytotoxic effects to the remainder of the plants, but in some embodiments this may not be possible.

The term "pesticidal amount" to mean an amount of the composition of the present invention that will be sufficient to control a given pest. This, the amount may vary according to the targeted pest, which implies that a lower concentration may be sufficient to control one pest, and that a higher concentration may be required to control another pest.

The terms "fruit" and "vegetable" are intended to mean the common language usage of "fruit" and "vegetable" which normally means the fleshy seed-associated structures of a plant that are sweet or sour, and edible in the raw state, such as apples, bananas, grapes, lemons, oranges, and strawberries. It also includes the botanical usage of "fruit" and "vegetable" which includes many structures that are not commonly called "fruits" or "vegetable", such as bean pods, corn kernels, tomatoes, and wheat grains.

The term "tuber" is intended to mean the enlarged structures in some plant species used as storage organs for nutrients. They are used for the plant's perennation (survival of the winter or dry months), to provide energy and nutrients for regrowth during the next growing season, and as a means of asexual reproduction. Stem tubers form from thickened rhizomes (underground stems) or stolons (horizontal connections between organisms). Common plant species with stem tubers include potato and yam. Some sources also treat modified lateral roots, (root tubers) under the definition; these are encountered in sweet potato, cassava, and dahlia.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1A:
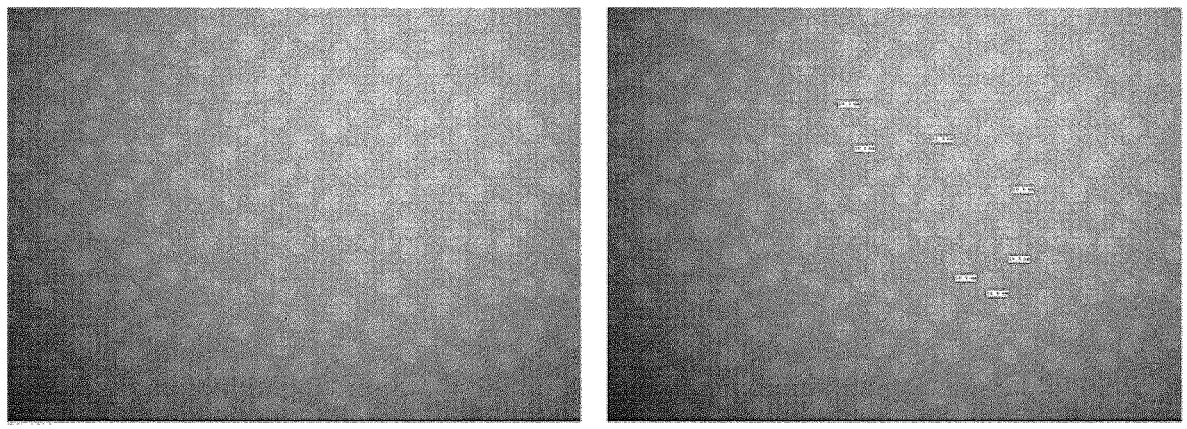
FIG. 1A illustrates the size of micelles in the aqueous disinfectant formulation of the present invention compared to previous technologies.

In embodiments there is disclosed an aqueous nano-emulsion formulation comprising thyme oil, solvent, sorbate, saponins and water. According to embodiments, the aqueous nano-emulsion formulation may be:
a) from about 0.05% to about 55% weight of oil;
b) from about 0.04% to about 65% weight of a solvent;
c) from about 0.01% to about 25% of a sorbate;
d) from about 0.00025% to about 0.37% weight of a saponin, in an amount sufficient to form a nano-emulsion of the oil in water; and
e) sufficient water to make 100 weight percent.

The present invention may be prepared as concentrate formulations as well as diluted formulations for specific uses.

Oils

In embodiment, the term oil is intended to mean any nonpolar chemical substance that is a viscous liquid at ambient temperatures and is both hydrophobic and lipophilic. Oils may have a high carbon and hydrogen content and are usually flammable and surface active. As used herein, oil includes both organic and mineral oils.

According to an embodiment, the oil may be an essential oil, or an active ingredient from an essential oil, that also has an oily nature when substantially isolated. An essential oil, as used herein, is a concentrated hydrophobic liquid containing volatile (easily evaporated at normal temperatures) chemical compounds from plants. Essential oils are also known as volatile oils, ethereal oils, aetherolea, or simply as the oil of the plant from which they were extracted, such as oil of clove. An essential oil is "essential" in the sense that it contains the "essence of" the plant's fragrance, i.e. the characteristic fragrance of the plant from which it is derived. Essential oils are generally extracted by distillation, often by using steam. Other processes include expression, solvent extraction, sfumatura, absolute oil extraction, resin tapping, wax embedding, and cold pressing. They are used in perfumes, cosmetics, soaps and other products, for flavoring food and drink, and for adding scents to incense and household cleaning products.

In regard to essential oil, some essential oils are known to be antimicrobial essential oils, antibacterial essential oils, disinfectant essential oils, and/or pesticidal essential oil, or a combination thereof. Such oils may of course be used to prepare aqueous nano-emulsions preserving and leveraging such properties of the essential oil(s) the comprise.

The essential oil may be any one of oil of anise, lemon oil, orange oil, oregano oil, rosemary oil (including Spanish rosemary oil), wintergreen oil, thyme oil, lavender oil, clove oil, hops oil, tea tree oil, citronella oil, wheat oil, barley oil, lemongrass oil, cedar leaf oil, cedar wood oil, cinnamon oil, fleagrass oil, geranium oil, sandalwood oil, violet oil, cranberry oil, eucalyptus oil, vervain oil, peppermint oil, basil oil, fennel oil, fir oil, balsam oil, ocmea origanum oil, Hydastis carradensis oil, Berberidaceae daceae oil, Ratanhiae oil, *Curcuma Longa* oil, sesame oil, macadamia nut oil, evening primrose oil, coriander oil, pimento berries oil, rose oil, bergamot oil, rosewood oil, chamomile oil, sage oil (including Spanish sage oil), clary sage oil, cypress oil, sea fennel oil, frankincense oil, ginger oil, grapefruit oil, jasmine oil, juniper oil, lime oil, mandarin oil, marjoram oil, myrrh oil, neroli oil, patchouli oil, pepper oil, black pepper oil, petitgrain oil, pine oil, rose otto oil, spearmint oil, spikenard oil, vetiver oil, a conifer essential oil, ylang ylang, or combinations thereof.

In embodiments, the conifer essential oil may be from any suitable conifer, such as cedars, Douglas firs, cypresses, firs, junipers, kauri, larches, pines, hemlocks, redwoods, spruces, and yews. Examples of spruce may be selected from the group consisting of *Picea breweriana, Picea sitchensis, Picea engelmannii, Picea glauca, Picea brachytyla, Picea chihuahuana, Picea farreri, Picea likiangensis, Picea martinezii, Picea maximowiczii, Picea morrisonicola, Picea neoveitchii, Picea orientalis, Picea purpurea, Picea schrenkiana, Picea smithiana, Picea spinulosa, Picea torano, Picea wilsonii, Picea abies, Picea alcoquiana, Picea alpestris, Picea asperata, Picea crassifolia, Picea glehnii, Picea jezoensis, Picea koraiensis, Picea koyamae, Picea mariana, Picea meyeri, Picea obovate, Picea omorika, Picea pungens, Picea retroflexa*, and *Picea rubens*.

According to other embodiments, the oil may also be neem oil, cottonseed oil, or combinations thereof.

Thyme Oil

In an embodiment, the active disinfectant ingredient in the aqueous nano-emulsion formulation of the present invention is thyme oil. Thymol is a natural monoterpenoid phenol derivative of cymene, $C_{10}H_{14}O$, isomeric with carvacrol, found in oil of thyme, and extracted from *Thymus vulgaris* and various other kinds of plants. The phenolic compounds of natural origin as used in the present invention can be synthetically made by known methods, or can be obtained from plant oil extracts.

In an embodiment of the present invention, the phenolic compounds of natural origin are obtained from plant extracts. In a further embodiment the phenolic compounds of natural origin are commercially available. In a yet further embodiment, the aqueous nano-emulsion formulation of the present invention comprises thyme oil of natural origin, of synthetic origin, or a combination thereof. Examples of thyme oils that may be used to make the aqueous nano-emulsion formulations of the present invention are listed in table 1.

TABLE 1

Exemplary thyme oil
Thyme Oils

| | | |
|---|---|---|
| VDH Organics 1 | Thyme Oil (Synthetic) | VDH/TO/451109/18-19 |
| VDH Organics 2 | Thyme Oil (Synthetic) | VDH/TO/444519/18-19 |
| Katyani Exports | Thyme Oil "KE" (Natural) | K-5655-KE-2017 |
| Katyani Exports | Thyme Oil 60% (Natural) | K-1548-KE-2018 |
| Rakesh Sandal Industries | Thyme Oil "RS" (Comp) | R000X3V14 |
| HBNO | Thyme Oil (Natural) | HBNO - 4255 |
| HBNO | Thyme Zygis Europe (Natural) | 1007182 |
| HBNO | Thyme Vulgaris India (Natural) | 3600 |
| BLAS LORENTE | Thymol, Thyme oil 100% natural | n/d |
| BLAS LORENTE | White thyme oil N.I. (Natural) | n/d |
| CARBONNEL | Thym Blanche (Synthetic) | 65059 |
| CARBONNEL | Thym Blanche (Synthetic) | 00420 |
| CARBONNEL | Thyme oil (Natural) | 00806 |
| Kush Aroma Exports | 100% Pure Thyme Essential Oil | KUSH/EO-100-003474/18-19 |
| Natures Natural India | Thyme Oil (Natural) | NNITHEO/234/1218 |
| Natures Natural India | Thyme Oil (Synthetic) | NNITSEO/433/1218 |
| AG Industries | Thyme Oil Pure (Natural) | FM/TMOLN/1901001 |
| AG Industries | Thyme Oil Synthetic | FM/TMOLN/19010021 |
| Shree Bankey | Thyme Oil Pure | SBBLBM/THYM/001/2017-18 |

According to an embodiment the aqueous nano-emulsion formulation of the present invention comprises thyme oil with variable percentages of phenolic compounds such as carvacrol, thymol, paracymene and terpinene. The composition of Natural (Nat) or Synthetic Natural-Identical (Syn) thyme oils used in the aqueous nano-emulsion formulation of the present invention are listed in table 2. Thyme oils may be present at from about 0.05% to about 55% weight of the formulation.

TABLE 2

Natural or synthetic natural-identical thyme oils used in the aqueous nano-emulsion formulation of the present invention

| Natural or Natural-Identical (Synthetic) Oils | Synt/Nat | Thymol % | Carvacrol % | Paracymene % | Terpinene % |
|---|---|---|---|---|---|
| VDH Organics 1 | Synthetic | 44.4 | 19.2 | 11.4 | 19.9 |
| VDH Organics 2 | Synthetic | 45 | 9.3 | 14.2 | 25.1 |
| Natures Natural India | Synthetic | 45.4 | 2.82 | 27.35 | 12.69 |
| Natures Natural India | Natural | 45.83 | 3.03 | 27.39 | 12.78 |
| AG Industries | Synthetic | 44.5 | 3.73 | 28.42 | 1.71 |
| AG Industries | Natural | 27.03 | 3.66 | 24.54 | 0.61 |
| Katyani Exports | Natural | 50 | 3.97 | 20.13 | 8.15 |
| Rakesh Sandal Industries | Natural | 52.65 | 6.3 | 14.23 | 10.5 |

Rosemary Oil

In an embodiment, the oil ingredient in the aqueous nano-emulsion formulation of the present invention is rosemary oil. α-pinene, camphor, 1,8-cineol, camphene, limonene, and linalool are among the constituents of this oil. The rosemary oil may be of natural origin, of synthetic origin, or a combination thereof.

Active Ingredient from an Essential Oil

The oil used in the nano-emulsion of the present invention may also be active isolated ingredient from an essential oil, that also has an oily nature when substantially isolated. Such ingredients may be thymol, carvacrol, cinnamaldehyde, citral, menthol, geraniol, capsaicin, paracymene or combinations thereof, for example.

Solvent

In an embodiment, the aqueous nano-emulsion formulation of the present invention further comprises at least one polar or non-polar solvent able to solubilize the phenolic compounds in thyme oil and other constituents of the formulation. Non-limiting examples of solvents include 1,2-dichloroethane, 2-butanone, acetone, acetonitrile, benzene, carbon tetrachloride, chloroform, cyclohexane, hexane, pentane, tetrahydrofuran, 1,1-dichloroethane, 1,2-dichloroethane, 1-butanol, 1-heptanol, 1-hexanol, 1-octanol, 1-pentanol, 1-propanol, 2-aminoethanol, 2-butanol, 2-butanone, 2-pentanol, 2-pentanone, 2-propanol, 3-pentanol, 3-pentanone, acetic acid, acetone, acetonitrile, acetyl acetone, aniline, anisole, benzene, benzonitrile, benzyl alcohol, butyl acetate, butyl lactate, carbon disulfide, carbon tetrachloride, chlorobenzene, chloroform, cyclohexane, cyclohexanol, cyclohexanone, dichloromethane, diethyl ether, diethylamine, diethylene glycol, diglyme, diisopropyl ether, dimethoxyethane, dimethylformamide, dimethylphthalate, dimethylsulfoxide, di-n-butylphthalate, dioxane, ethanol, ether, ethyl acetate, ethyl acetoacetate, ethyl benzoate, ethylene glycol, glycerol, heptane, hexane, 1-butanol, isopropanol, methanol, methyl acetate, methyl t-butyl ether, methylene chloride, methyl-t-butyl ether, N,N-dimethylaniline, pentane, p-xylene, pyridine, t-butyl alcohol, tetrahydrofuran, toluene, trichloroethylene, water, heavy water, and xylene. In an embodiment, the aqueous nano-emulsion formulation of the present invention further comprises at least two solvents, or at least three solvents, or at least four solvents, or at least five solvents. According to a preferred embodiment the aqueous nano-emulsion formulation of the present invention comprises at least three solvents. In a preferred embodiment of the aqueous nano-emulsion formulation of the present invention the at least three solvents comprise isopropanol, glycerol, and butyl lactate. The formulation of the present invention may comprise from about 0.04% to about 65%, or from about 0.4% to about 65%, or from about 1% to about 65%, or from about 10% to about 65%, or from about 20% to about 65%, or from about 30% to about 65%, or from about 40% to about 65%, or from about 50% to about 65%, or from about 60% to about 65%, or from about 0.4% to about 60%, or from about 1% to about 60%, or from about 10% to about 60%, or from about 20% to about 60%, or from about 30% to about 60%, or from about 40% to about 60%, or from about 50% to about 60%, or from about 0.4% to about 50%, or from about 1% to about 50%, or from about 10% to about 50%, or from about 20% to about 50%, or from about 30% to about 50%, or from about 40% to about 50%, or from about 0.4% to about 40%, or from about 1% to about 40%, or from about 10% to about 40%, or from about 20% to about 40%, or from about 30% to about 40%, or from about 0.4% to about 30%, or from about 1% to about 30%, or from about 10% to about 30%, or from about 20% to about 30%, or from about 0.4% to about 20%, or from about 1% to about 20%, or from about 10% to about 20%, from about 0.4% to about 10%, or from about 1% to about 10%, or from about 0.4% to about 1% weight of solvent.

Sorbate

In an embodiment, the aqueous nano-emulsion formulation of the present invention comprises a sorbate. Sorbates are primarily used as preservatives in the food industry. However, as previously described, the sorbate in the present invention further acts as a co-surfactant to increase the number of micelles in the nano-emulsion, and amplifies the antimicrobial effect of the aqueous nano-emulsion formulation. The sorbate may be potassium sorbate, sodium sorbate, calcium sorbate, sorbic acid, or combinations thereof.

In a preferred embodiment, the sorbate is potassium sorbate. Potassium sorbate is also used as a food preservative that has been effectively used for decades is GRAS to preserve food products. Studies using concentration of potassium similar to those of body care products found that potassium sorbate is practically non-irritating and non-sensitizing [Final Report on the Safety Assessment of Sorbic Acid and Potassium Sorbate. UITO International Journal of Toxicology, 7(6), 837-880 (1988)]. In fact, the toxicity of potassium sorbate is close to that of table salt. Potassium sorbate is also included in the Handbook of Green Chemicals, approved by the Natural Products Association, and is also Whole Foods Premium Body Care approved.

Recent findings continue to validate the safety of potassium sorbate when used in proximity to humans, and when consumed. The European Food Safety Authority (EFSA) set an acceptable daily intake of 3 mg per kg of body weight per day. Rats were fed 300 mg per day with no observed deleterious effects. In the USA, the maximum acceptable daily intake for humans is 25 milligrams per kilogram (mg per kg) of body weight per day. For an adult of 150 pounds, this comes to 1,750 mg per day.

Additionally, potassium sorbate is well characterized as safe for use in agricultural use as a "mold inhibitor", and sorbic acid and other unsaturated aliphatic mono-carboxylic acids and their salts are known to be effective at inhibiting the growth of microorganisms in agriculture.

In the present invention potassium sorbate contributes to the formation and stability of nano-emulsion droplets or micelles smaller than 200 nm in diameter. The smaller size of micelles is believed to be advantageous to render the emulsion formulation relatively impervious to gravitational sedimentation or creaming. Most importantly, the stability of the formulation in turn is directly related to its efficacy. The smaller nano-emulsions droplets per unit volume (of thyme oil) providing a greater number of micelles, which in turn provides a higher incidence of contact between the antimicrobial formulation and the targeted microbes. A crucial advantage of the small nano-emulsions is the higher stability and greater solubility of the concentrate formulation. Consequently, the final diluted product used for cleaning or disinfecting purposes is more homogenous and thermodynamically stable. The formulations of the present invention may comprise from about 0.01% to about 25%, or from about 0.1% to about 25%, or about 1% to about 25%, or about 10% to about 25%, or about 15% to about 25%, or about 20% to about 25%, or about 0.01% to about 20%, or from about 0.1% to about 20%, or about 1% to about 20%, or about 10% to about 20%, or about 15% to about 20%, or about 0.01% to about 15%, or from about 0.1% to about 15%, or about 1% to about 15%, or about 10% to about 15%, or about 0.01% to about 10%, or from about 0.1% to about 10%, or about 1% to about 10%, or about 0.01% to about 1%, or from about 0.1% to about 1%, or about 0.01% to about 0.1% weight of a sorbate.

Saponins

In embodiment, the aqueous nano-emulsion formulation of the present invention comprises a saponin.

Saponins are a class of chemical compounds found in particular abundance in various plant species. More specifically, they are amphipathic glycosides grouped phenomenologically by the soap-like foam they produce when shaken in aqueous solutions, and structurally by having one or more hydrophilic glycoside moieties combined with a lipophilic triterpene or steroid derivative. Saponins are commonly used as natural non-ionic surfactants, emulsification, foaming agents, and detergents, in a variety of industries including food, cosmetics, agricultural and pharmaceutics. The formulations of the present invention may comprise from about 0.00025% to about 0.37%, or about 0.0025% to about 0.37%, or about 0.025% to about 0.37%, or about 0.25% to about 0.37%, or about 0.00025% to about 0.35%, or about 0.0025% to about 0.35%, or about 0.025% to about 0.35%, or about 0.25% to about 0.35%, or about 0.00025% to about 0.30%, or about 0.0025% to about 0.30%, or about 0.025% to about 0.30%, or about 0.25% to about 0.30%, or about 0.00025% to about 0.25%, or about 0.0025% to about 0.25%, or about 0.025% to about 0.25%, or about 0.00025% to about 0.20%, or about 0.0025% to about 0.20%, or about 0.025% to about 0.20%, or about 0.00025% to about 0.15%, or about 0.0025% to about 0.15%, or about 0.025% to about 0.15%, or about 0.00025% to about 0.10%, or about 0.0025% to about 0.10%, or about 0.025% to about 0.10%, or about 0.00025% to about 0.05%, or about 0.0025% to about 0.05%, or about 0.025% to about 0.05% weight of a saponins.

In embodiments, the saponin may be provided by a vegetal extract, such as a *Quillaja saponaria* extract, a *Yucca schidigera* extract, a horse chestnut extract, a tea seed extract, a soybean extract, and combinations thereof. In a preferred embodiment of the aqueous nano-emulsion formulation of the present invention, the vegetal extract is a *Quillaja saponaria* extract and comprises from about 0.004 to about 0.5%, or about 0.04 to about 0.5%, or about 0.04 to about 0.5%, or about 0.4 to about 0.5%, or about 0.004 to about 0.4%, or about 0.04 to about 0.4%, or about 0.04 to about 0.4%, about 0.004 to about 0.3%, or about 0.04 to about 0.3%, or about 0.04 to about 0.3%, about 0.004 to about 0.2%, or about 0.04 to about 0.2%, or about 0.04 to about 0.2%, about 0.004 to about 0.1%, or about 0.04 to about 0.1%, or about 0.04 to about 0.1% weight of the *Quillaja saponaria* extract.

*Quillaja* extract, is a food-safe compound that has high hydrophilic capacity of saponins and can form stable oil-in-water (O/W) emulsions. The emulsions formed are stable under acidic conditions and in the presence of salts. In the present invention, the surfactant-like properties of the saponins, such as those found in *Quillaja* extract are used to produce highly effective emulsion-based disinfectant.

In the present invention, the use of natural bio-surfactant *Quillaja* and potassium sorbate yields several advantages with respect to overall safety and convenience, the smaller size of the micelles of the nano-emulsion, and effective anti-bactericidal and anti-microbial properties as discussed below. The present work uses the surfactant properties of a mixed food-safe surfactant systems of *Quillaja* saponins and a food-grade co-surfactant such as potassium sorbate. The practical application of the inventions yields a needed alternative to more toxic and cumbersome antimicrobials in use today. In combination with *Quillaja* and other small polar solvents, sorbate provides smaller micelles as compared to other common, commercially available surfactants, and other detergent based surfactants.

pH Adjusting Agent

In an embodiment, the aqueous nano-emulsion formulation of the present invention further comprises from about 0.0002% to about 0.3% weight of a pH adjusting agent. In an embodiment of the present invention the pH adjusting agent is used to maintain the ionic balance of the formulation. Non-limiting examples of pH adjusting agents according to an embodiment of the present invention include at least one of citric acid, lactic acid, hydrochloric acid, boric acid, acetic acid, sodium hydroxide, potassium hydroxide, sulfuric acid, calcium carbonate ($CaCO_3$), ammonium carbonate, ammonium bicarbonate, ammonium citrate, sodium citrate, magnesium carbonate, sodium carbonate, mono, di and/or trisodium phosphate, mono, di and/or tripotassium phosphate, tris(hydroxymethyl) aminomethane (TRIS), amino acids and zwitterions, such as glycine, 2-amino-2methyl-1,3-propanediol (AMPD), N-(1,1-dimethyl-2-hydroxyethyl)-3-amino-2-hydroxypropanesulfonic acid (AMPSO), N-glycylglycine (Gly-Gly), 4-(2-hydroxyethyl)piperazine-1-propanesulfonic acid (EPPS or HEPPS), 3-(cyclohexylamino)-1-propanesulfonic acid (CAPS), 3-(cyclohexylamino)-2-hydroxy-1-propanesulfonic acid (CAPSO), 2-(cyclohexylamino)ethanesulfonic acid (CHES), N,N-bis[2-hydroxyethyl]-2-aminoethanesulphonic acid (BES), (2-[2-hydroxy-1,1-bis(hydroxymethyl)ethylamino]ethanesulphonic acid) (TES), 2-(N-morpholino)ethanesulfonic acid (MES), N-[tris(hydroxymethyl)methyl]glycine (tricine); N-tris(hydroxymethyl)methyl-3-aminopropanesulfonic acid (TAPS) and 3-N-morpholinopropanesulfonic acid (MOPS), piperazie-N,N'-bis[2-hydroxypropanesulphonic]acid (POPSO), and combinations thereof. In a further embodiment of the aqueous nano-emulsion formulation of the present invention the pH adjusting agent is at least one of citric acid.

In an embodiment, the aqueous nano-emulsion formulation of the present invention comprises a pH ranging from about 6 to about 9.

The formulations of the present invention may comprise from about 0.0002% to about 0.3%, or about 0.002% to about 0.3%, or about 0.02% to about 0.3%, or about 0.2% to about 0.3%, or about 0.0002% to about 0.2%, or about 0.002% to about 0.2%, or about 0.02% to about 0.2%, or about 0.0002% to about 0.1%, or about 0.002% to about 0.1%, or about 0.02% to about 0.1%, or about 0.0002% to about 0.05%, or about 0.002% to about 0.05%, or about 0.02% to about 0.05%, or about 0.0002% to about 0.005%, or about 0.002% to about 0.005%, or about 0.0002% to about 0.0005% weight pH adjusting agent.

Vitamin C

In embodiments, the aqueous nano-emulsion formulation of the present invention may comprise vitamin C, also known as ascorbic acid and ascorbate. The aqueous nano-emulsion formulation comprises from about 0.002 to about 10%, or from about 0.02% to about 10%, or from about 0.2% to about 10%, or from about 1% to about 10%, or from about 2% to about 10%, or from about 3% to about 10%, or from about 4% to about 10%, or from about 5% to about 10%, or from about 6% to about 10%, or from about 7% to about 10%, or from about 8% to about 10%, or from about 9% to about 10%, or from about 0.002 to about 9%, or from about 0.02% to about 9%, or from about 0.2% to about 9%, or from about 1% to about 9%, or from about 2% to about 9%, or from about 3% to about 9%, or from about 4% to about 9%, or from about 5% to about 9%, or from about 6% to about 9%, or from about 7% to about 9%, or from about 8% to about 9%, or from about 0.002 to about 8%, or from about 0.02% to about 8%, or from about 0.2% to about 8%, or from about 1% to about 8%, or from about 2% to about 8%, or from about 3% to about 8%, or from about 4% to about 8%, or from about 5% to about 8%, or from about 6% to about 8%, or from about 7% to about 8%, or from about 0.002 to about 7%, or from about 0.02% to about 7%, or from about 0.2% to about 7%, or from about 1% to about 7%, or from about 2% to about 7%, or from about 3% to about 7%, or from about 4% to about 7%, or from about 5% to about 7%, or from about 6% to about 7%, or from about 0.002 to about 6%, or from about 0.02% to about 6%, or from about 0.2% to about 6%, or from about 1% to about 6%, or from about 2% to about 6%, or from about 3% to about 6%, or from about 4% to about 6%, or from about 5% to about 6%, or from about 0.002 to about 5%, or from about 0.02% to about 5%, or from about 0.2% to about 5%, or from about 1% to about 5%, or from about 2% to about 5%, or from about 3% to about 5%, or from about 4% to about 5%, or from about 0.002 to about 4%, or from about 0.02% to about 4%, or from about 0.2% to about 4%, or from about 1% to about 4%, or from about 2% to about 4%, or from about 3% to about 4%, or from about 0.002 to about 3%, or from about 0.02% to about 3%, or from about 0.2% to about 3%, or from about 1% to about 3%, or from about 2% to about 3%, or from about 0.002 to about 2%, or from about 0.02% to about 2%, or from about 0.2% to about 2%, or from about 1% to about 2%, or from about 0.002 to about 1%, or from about 0.02% to about 1%, or from about 0.2% to about 1%, or from about 0.002 to about 0.2%, or from about 0.02% to about 0.2%, or from about 0.002 to about 0.02% weight of the vitamin C.

In an embodiment, the aqueous nano-emulsion formulation of the present invention comprises:
a) from about 0.05% to about 55% weight of oil;
b) from about 0.005% to about 7.5% weight of isopropanol;
c) from about 0.02% to about 30% weight of glycerol;
d) from about 0.02% to about 27% weight of butyl lactate;
e) from about 0.01% to about 25% of potassium sorbate;
f) from about 0.0004% to about 0.5% weight of a *Quillaja saponaria* extract, in an amount sufficient to form a nano-emulsion of the oil in water;
g) from about 0.0002% to about 0.3% weight of citric acid; and
h) sufficient water to make 100 weight percent.

In an embodiment, the aqueous nano-emulsion formulation of the present invention, comprises no additional surfactant. The aqueous nano-emulsion formulation may be free of any non-natural surfactants that may be considered deleterious to crops or seeds, for example.

In an embodiment, the aqueous nano-emulsion formulation of the present invention comprises no additional disinfectant, pesticide or sanitizer. The aqueous nano-emulsion formulation may be free of any additional ingredients having an additional disinfectant, pesticide or sanitizer activity over that of thyme oil and the ingredients disclosed herein having such activities.

In an embodiment, the aqueous nano-emulsion formulation of the present invention comprises a pH ranging from about 6 to about 9.

Surfactants

In another embodiment, the aqueous nano-emulsion formulation of the present invention may further comprise a surfactant. As used herein the term "surfactant" is intended to mean the amphiphilic compounds having hydrophobic groups (often referred to as "tails") and hydrophilic groups (often referred to as "heads"). They are also referred to as detergents, and are distinct from the saponins described above. A surfactant (surface active agent) is generally intended to refer to a substance which, when dissolved in water, or other aqueous systems, reduces the surface or interfacial tension between it and another substance or material.

In an embodiment of the present invention, the surfactant aids in the dispersion or emulsification of the essential oils within the aqueous carrier. In a further embodiment of the present invention, the surfactant increases the number of micelles in the nano-emulsion, and amplifies the antimicrobial effect of the aqueous nano-emulsion formulation.

Non-limiting examples of surfactants according to an embodiment of the present invention include:
1. Anionic Alpha Sulfo Methyl Sodium Methyl 2-Sulfolaurate 149458-07-1
2. Anionic Diphenyl Oxide Sodium Dodecyl Diphenyl 1 19345-04-9
3. Anionic Diphenyl Oxide Sodium Decyl Diphenyl Oxide 36445-71-3
4. Anionic Dodecyl Benzene Sodium 68081-81-2
5. Anionic Dodecylbenzene Dodecylbenzene Sulfonic 68584-22-5
6. Anionic ether Carboxylate Capryleth-9 Carboxylic Acid 53563-70-5 and Hexeth-4 Carboxylic Acid 105391-15-9
7. Anionic Ether Carboxylate Glycolic Acid Ethoxylate Lauryl 27306-90-7
8. Anionic Isethionate Sodium Cocoyl Isethionate 61789-32-0
9. Anionic Lauryl Ether Sulfates Sodium Lauryl Ether Sulfate 9004-82-4
10. Anionic Lauryl Sulfates Sodium Lauryl Sulfate 151-21-3
11. Anionic Lauryl Sulfates Triethanolamine Lauryl 90583-18-9
12. Anionic Lauryl Sulfates Magnesium Lauryl Sulfate 3097-08-3
13. Anionic Phosphate Esters Nonoxynol-10 Phosphate 51609-41-7
14. Anionic Phosphate Esters Deceth 4 Phosphate 68921-24-4
15. Anionic Phophanates Amino Trismethylene Phosphonic Acid 20592-85-2
16. Anionic Phophanates 1-Hydroxyethylidene-1,1,-Diphosphonic Acid 2809-21-4
17. Anionic Sarcosinate Sodium Lauroyl Sarcosinate 137-16-6
18. Anionic Sulfosuccinates Disodium Laureth 68815-56-5
19. Anionic Xylene Sulfonates Sodium Xylene Sulfonate 1300-72-7
20. Cationic Amine Oxides Lauramine Oxide 1643-20-5
21. Cationic Amine Oxides Cocamidopropylamine Oxide 68155-09-9
22. Cationic Amine Oxides Lauryl/Myristyl Amidopropyl 61792-31-2 and Amine Oxide 67806-10-4
23. Cationic Amine Oxides Tallow Amine+2 EO 61791-46-6
24. Cationic Amine Oxides Myristamine Oxide 3332-27-2
25. Cationic Onium Compound Soyethyl Morpholinium 61791-34-2 Ethosulfate
26. Cationic Quaternized Dioleyloylethyl 94095-35-9
27. Cationic Quaternized Quaternium 18 (Distearyl 61789-80-8)
28. Cationic Quaternized Alkyl Dimethyl Benzyl 68424-85-1
29. Cationic Quaternized Quaternium 12 (Didecyl 7173-51-5)
30. Cationic Quaternized Dialkyl Dimethyl Ammonium 68424-95-3
31. Amphoteric Betaine Cocamidopropyl Betaine 61789-40-0
32. Amphoteric Betaine Cetyl Betaine 693-33-4 and 0683-10-3
33. Amphoteric Betaine Lauramidopropyl Betaine 4292-10-8
34. Amphoteric Imidazolium Disodium 68604-71-7 Compound Cocoamphodipropionate
35. Amphoteric Imidazolium Disodium 68650-39-5 Compound Cocoamphodiacetate 36. Amphoteric Imidazolium Sodium Cocoamphoacetate 68608-65-1 Compound
37. Amphoteric Sultaine Lauryl Hydroxysultaine 13197-76-7
38. Nonionic Alcohol Ethoxylates Linear alcohol (C1 1) 34398-01-1 Ethoxylate, POE-7
39. Nonionic Alcohol Ethoxylates Linear Alcohol (C9-1 1) 68439-46-3 ethoxylate, POE-2.5
40. Nonionic Alcohol Ethoxylates Lauryl Alcohol Ethoxylate, 9002-92-0
41. Nonionic Alcohol Ethoxylates Secondary Alcohol 84133-50-7
42. Nonionic Alkanolamides Trideceth-2 Carboxamide 107628-04-6
43. Nonionic Alkanolamides PEG-4 Rapeseedamide 85536-23-8
44. Nonionic Alkanolamides PEG 5 Cocamide 68425-44-5
45. Nonionic Alkanolamides Cocamide DEA 68603-42-9
46. Nonionic Alkanolamides Lauramide MEA 142-78-9
47. Nonionic Alkanolamides Cocamide MEA 68140-00-1
48. Nonionic Alkanolamides Lauramide DEA 120-40-1
49. Nonionic Alkanolamides Oleamide DEA 93-83-4
50. Nonionic Alkyl Polyglycosides Caprylyl/Myristyl Glucosid 68515-73-1 and 1 10615-47-9
51. Nonionic Alkyl Polyglycosides Lauryl/Myristyl Glucosid 1 10615-47-9
52. Nonionic Alkyl Polyglycosides Caprylyl/Decyl Glucoside 68515-73-1
53. Nonionic Amide N,N-Dimethyldecanamide 14433-76-2
54. Nonionic Biosurfactant Sophorolipid-Nonionic Esters Isopropyl Myristate 1 10-27-0
55. Nonionic Esters Isopropyl Palmitate 142-91-6
56. Nonionic Fatty Acid, Natural Glycereth-17 Cocoate 68201-46-7 origin
57. Nonionic Fatty Acid, Natural Glycereth-6 Cocoate 68201-46-7 origin
58. Nonionic Fatty Acid, Natural PEG/PPG-6/2 Glyceryl 72245-1-1-5 origin cocoate
59. Nonionic Fatty Alcohol Cetostearyl Alcohol 67762-27-0
60. Nonionic Fatty Amine PEG 2 Cocamine 61791-14-8
61. Nonionic Fatty Amine PEG 2 Tallow Amine 61791-26-2
62. Nonionic Glycerol Ester Glycereth-7 36145938-3
63. Nonionic Glycerol Ester Caprylic/Capric Triglyceride 73398-61-5
64. Nonionic Glycerol Ester Glyceryl Oleate 37220-82-9
65. Nonionic Glycerol Ester Glyceryl Stearate 123-94-4
66. Nonionic Lactate Lauryl Lactyl Lactate 910661-93-7
67. Nonionic Sorbitan Ester Polysorbate 80 9005-65-6
68. Lecithin 8002-43-5
69. Polyoxyethylene (20) Oleyl Ether 9004-98-2
70. Polyethylene Glycol Hexadecyl Ether Polyoxyethylene (20) Cetyl Ether 2724259
71. Polyethylene Glycol Oleyl Ether Polyoxyethylene (2) Oleyl Ether 9004-98-2
72. Polyethylene Glycol Hexadecyl Ether Polyoxyethylene (10) Cetyl Ether 9004-95-9
73. Polyethylene Glycol Dodecyl Ether Polyoxyethylene (4) Lauryl Ether 9002-92-0
74. Polyoxyethylene (100) Stearyl Ether 9005-00-9;
75. Polyethylene Glycol Octadecyl Ether Polyoxyethylene (10) Stearyl Ether 9005-00-9
76. Tetronic 90R4 26316-40-5
77. Tetronic 701 26316-40-5
78. Polyoxyethylene (12) Isooctylphenyl Ether Polyoxyethylene (12) Octylphenyl Ether, Branched 9002-93-1
79. Polyoxyethylene (12) Tridecyl Ether 78330-21-9
80. PEG-PPG-PEG Pluronic® L-64

Other Emulsifying Agents

In another embodiment, the aqueous nano-emulsion formulation of the present invention may further other emulsifying agent; that is, agents distinct from the surfactants discussed above. Such emulsifying agent include but are not limited to egg yolk lecithin, soy lecithin, mustard, sodium phosphate, mono and diglycerides, sodium stearoyl lactylate, diacetyl tartaric acid ester of monoglyceride, cellulose, oleic acid (oleate). According to a preferred embodiment, the additional emulsifying agent is oleic acid. Oleic acid as its sodium salt is a major component of soap as an emulsifying agent. It is also used as an emollient.

Water

In an embodiment, the aqueous nano-emulsion formulation of the present invention is a concentrate comprising water. The water in the formulation of the concentrate is used at a low percentage to maintain the polarity and solubility of the formulation, and bring the total volume to 100%.

Fragrances

Phenolic compounds typically have an associated pungent odor severely impeding application. In an embodiment, the pesticide compositions of the present invention may thus further comprise one or more agents having the dual function of further enhancing the disinfectant properties of the compositions while imparting a more pleasant odor thereto. In yet a further embodiment of the present invention, the pesticide compositions of the present invention may further comprise one or more agents imparting a pleasant odor thereto (fragrance agent). Non-limiting examples of agents imparting a pleasant odor and/or enhancing the disinfectant properties comprise carvacrol, cymene, cineol, eugenol, thymol, menthol, citral and limonene. Further suitable examples of such agents are within the capacity of a skilled technician.

The pesticide composition of the present invention may be used alone or in combination with one or more substances that are used in agricultural settings. i.e. as part of supplements. Examples of substances include but are not limited to pesticides, such as disinfectants, fungicide, bactericide, virucide, insect repellent, arthropod repellent, nematicide, insecticide, acaricide, herbicide and plant growth regulators. Substances also include fertilizers, such as inorganic fertilizer, nitrogen fertilizer, potassium fertilizer, phosphate fertilizer, organic fertilizer, manure, compost, rock phosphate, bone meal, alfalfa, wood chips, langbeinite, cover crops, potassium sulfate, rock powder, ash, blood meal, fish meal, fish emulsion, algae, chitosan and molasses. Substances also include defoamers such as mineral oil, vegetable oil, paraffin wax, ester wax, silica, fatty alcohol, silicone, polyethylene glycol, polypropylene glycol copolymers and alkyl polyacrylates.

Pesticides

Most control measures are directed against inoculum of the pathogen and involve the principles of exclusion and avoidance, eradication, protection, host resistance and selection, and therapy. Control measures include the control of vectors of pathogens (insects and nematodes for example) and chemical control (pesticides). A variety of chemicals are available that have been designed to control plant diseases by inhibiting the growth (e.g. by inactivation or deactivation of the pathogens) of or by killing the disease-causing pathogens. Chemicals used to control bacteria (bactericides), fungi (fungicides), and nematodes (nematicides) may be applied to seeds, foliage, flowers, fruit, or soil. Soil treatments are designed to kill soil-inhabiting nematodes, fungi, and bacteria. This eradication can be accomplished using steam or chemical fumigants. Soilborne nematodes can be killed by applying granular or liquid nematicides. Most soil is treated well before planting; however, certain fungicides can be mixed with the soil at planting time. Seeds, bulbs, corms, and tubers are frequently treated with chemicals to eradicate pathogenic bacteria, fungi, and nematodes and to protect the seeds against organisms in the soil—mainly fungi—that cause decay and damping-off. Seeds are often treated with systemic fungicides, which are absorbed and provide protection for the growing seedling. Protective sprays and dusts applied to the foliage and fruit of crops and ornamentals include a wide range of organic chemicals designed to prevent infection. Protectants are not absorbed by or translocated through the plant; thus, they protect only those parts of the plant treated before invasion by the pathogen. A second application is often necessary because the chemical may be removed by wind, rain, or irrigation or may be broken down by sunlight. New, untreated growth also is susceptible to infection. New chemicals are constantly being developed.

Aside from plant-diseases caused by organisms listed above, animals like rodents and birds are responsible for important pre-harvest damage. On a global scale, it was recently estimated that almost 280 million undernourished people could additionally benefit if more attention were paid to reducing pre- and post-harvest losses by rodents. Rodents are hazardous, as they can amplify pathogens from the environment and form reservoirs of (zoonotic) disease. With application of proper rodent control methods, it is possible to reduce the hazards of rodent-borne diseases in areas where humans, food animals and rodents are living close to each other. These control measures include animal and bird repellents and anti-microbials to control pathogens introduced by them.

Any organism that damages crops or reduces the fertility of land can be defined as a pest. These include fungus, bacteria, virus, insects, nematodes, parasites, gastropods, arthropods, snails, slugs, vertebrates (mammal and birds), algae, etc. Chemicals used to kill or repel pests are called pesticides. As reported by the EPA, here is a list of examples of pesticides:

TABLE 3

Examples of pesticides

| Pesticide | Targeted organism (pest) |
| --- | --- |
| Algicides | Control algae in lakes, canals, swimming pools, water tanks, and other sites. |
| Antifouling agents | Kill or repel organisms that attach to underwater surfaces, such as boat bottoms |
| Antimicrobials | Kill microorganisms (such as bacteria and viruses). |
| Attractants | Attract pests (for example, to lure an insect or rodent to a trap). (However, food is not considered a pesticide when used as an attractant.) |
| Biocides | Kill microorganisms. |
| Biopesticides | Biopesticides are certain types of pesticides derived from such natural materials as animals, plants, bacteria, and certain minerals. |
| Disinfectants and sanitizers | Kill or inactivate disease-producing microorganisms on inanimate objects. |
| Fungicides | Kill fungi (including blights, mildews, molds, and rusts) |
| Fumigants | Produce gas or vapor intended to destroy pests in buildings or soil. |
| Herbicides | Kill weeds and other plants that grow where they are not wanted. |
| Insecticides | Kill insects and other arthropods. |
| Miticides (also called acaricides) | Kill mites that feed on plants and animals. |
| Microbial pesticides | Microorganisms that kill, inhibit, or out compete pests, including insects or other microorganisms. |
| Molluscicides | Kill snails and slugs. |
| Nematicides | Kill nematodes (microscopic, worm-like organisms that feed on plant roots). |
| Ovicides | Kill eggs of insects and mites. |
| Pheromones | Biochemicals used to disrupt the mating behavior of insects. |
| Repellents | Repel pests, including insects (such as mosquitoes) and birds. |
| Rodenticides | Control mice and other rodents. |
| Defoliants | Cause leaves or other foliage to drop from a plant, usually to facilitate harvest. |
| Desiccants | Promote drying of living tissues, such as unwanted plant tops. |
| Insect growth regulators | Disrupt the molting, maturity from pupal stage to adult, or other life processes of insects. |
| Plant growth regulators | Substances (excluding fertilizers or other plant nutrients) that alter the expected growth, flowering, or reproduction rate of plants. |

Pesticides include a wide variety of substances usually targeting specific pests. Major chemical groups represented by pesticides are resumed in Table 3:

TABLE 4

Major Chemical Groups of pesticides

| CHEMICAL GROUP | TYPE OF PESTICIDE |
|---|---|
| Acetamide | herbicide |
| Acylalanine + Carboxamide + Dithiocarbamate + Neonicotinoid | fungicide/insecticide |
| Acylalanine + Triazole | fungicide |
| Acylalanines | fungicide |
| Acylalanines + Chloronitriles | fungicide |
| Amide | herbicide |
| Amide/Aniline | insecticide |
| Anilide | fungicide |
| Anilino Pyrimidine | fungicide |
| Antibiotic | fungicide |
| Aryloxphenoxy propionate | herbicide |
| Aryloxyphenoxy Acids | herbicide |
| Avermectin, Alcohol | miticide |
| Benzamide | herbicide |
| Benzamide + Dithiocarbamate | fungicide |
| Benzenamine | rodenticide |
| Benzimidazole | fungicide |
| Benzimidazole + Organophosphate + Phthalic Acid | insecticide/fungicide |
| Benzoic acid | herbicide |
| Benzothiadiazole | herbicide |
| Bipyridylium | herbicide |
| Carbamate (e.g. aldicarb, carbofuran, carbaryl, ethienocarb, fenobucarb, oxamyl, and methomyl) | Fungicide/growth regulator/insecticide/miticide/nematicide |
| Carbamate + Chloronitrile | fungicide |
| Carboxamide | fungicide |
| Carboxamide + Dithiocarbamate + Neonicotinoid | fungicide/insecticide |
| Carboxylic Acid | herbicide |
| Chlorinated Hydrocarbon | plant growth regulator |
| Chloroacetamide | herbicide |
| Chloro-nicotinyl | insecticide |
| Chloronitrile | fungicide |
| Chlorophenol | fungicide |
| Chlorophenyl | fungicide |
| Coumarin | rodenticide |
| Cyanoacetamide- | fungicide |
| Cyclohexanedione | Herbicide/plant growth regulator |
| Cyclohexanetrione | growth regulator |
| Dicarboximide | fungicide |
| Dinitroaniline | herbicide |
| Diphenylether | herbicide |
| Dithiocarbamate | fumigant, nematicide, fungicide, rodenticide, insecticide |
| Fatty Acid | insecticide/herbicide |
| Glycine | herbicide |
| Guanidine | fungicide |
| Halogenated Hydrocarbons | fumigant |
| Hydroxyanilide | fungicide |
| Hydroxycoumarin | rodenticide |
| Imidazolinone | herbicide |
| Indanedione | rodenticide & deer repellant |
| Inorganic | Fungicide, algicide, insecticide, rodenticide |
| Microbial | Bactericide, insecticide, |
| Morpholine | fungicide |
| Neonicontinoid + Triazole + Acylalanine + Phenylpyrrole | insecticide/fungicide |
| Nicotine | insecticide |
| Nitrile | herbicide |
| Nitro derivative | fungicide |
| nitroguanidine | insecticide |
| Organic Acid | Herbicide, plant growth regulator |
| Organochlorine | Insecticide, miticide |
| Organometallic | Fungicide, miticide |
| Organophosphate | insecticide/miticide/nematicide |
| Organophosphate + Phthalic Acid | insecticide/fungicide |
| Oxadiazole | herbicide |
| Phenoxy | herbicide |
| Phenyl-Carbamate + Phenyl-Carbamate | herbicide |
| Phenylpyrrole + Triazole + Neonicotinoid + Acylalanine | fungicide/insecticide |

TABLE 4-continued

Major Chemical Groups of pesticides

| CHEMICAL GROUP | TYPE OF PESTICIDE |
| --- | --- |
| Phthalamate | herbicide |
| Phthalic Acid + Organophosphate + Benzimidazole | insecticide/fungicide |
| Phthalimide | fungicide |
| Piperazine | fungicide |
| Pyrethrins | insecticide |
| Pyrethroid | insecticide |
| Pyridazinone | insecticide/miticide |
| Quaternary ammonium | Algaecide, disinfectant, herbicide |
| Quinolineacid | herbicide |
| Strobilurin | fungicide |
| Substituted benzoylurea | insecticide |
| Sulfonylurea | herbicide |
| Synethetic pyrethroid | insecticide |
| Tetrazine | miticide |
| Thiadiazole | fungicide |
| Thiocarbamate | herbicide |
| Triazapentadiene | insecticide |
| Triazine | fungicide |
| Triazole | fungicide |
| Uracil | herbicide |
| Urea | herbicide |
| dichloropropene | fumigant |
| dichloropropene + chlorpicrin | fumigant |
| metam sodium | fumigant, nematicide |
| oxine benzoate | fungicide |
| formaldehyde | fungicide, fumigant |
| Stoddard solvent | herbicide |
| metaldehyde | molluscicide |
| ancymidol | plant growth regulator |
| ethephon | plant growth regulator |
| gibberellic acid | plant growth regulator |
| gibberellins + benazladenine | plant growth regulator |
| maleic hydrazide | plant growth regulator |
| NAA | plant growth regulator |
| napthalene acetamide | plant growth regulator |
| paclobutrazol | plant growth regulator |
| putrescent whole egg solids | repellents |
| strychnine | rodenticide |
| zinc phosphide | rodenticide |

It is well within the skill of the person skilled in the art to determine how much of any given pesticide may be added to the compositions of the present invention in order to obtain the pesticidal effect desired.

Fertilizers and Combined Use of Pesticides and Fertilizers

Fertilizers are defined as any material of natural or synthetic origin that is added to soil to supply one or more plant nutrients essential to the growth of plants. Fertilizers come in various forms. The most typical form is solid fertilizer in granulated or powdered forms. The next most common form is liquid fertilizer. Fertilizers typically provide, in varying proportions: six macronutrients (nitrogen (N), phosphorus (P), potassium (K), calcium (Ca), magnesium (Mg), and sulfur (S)); and eight micronutrients (boron (B), chlorine (Cl), copper (Cu), iron (Fe), manganese (Mn), molybdenum (Mo), zinc (Zn) and nickel (Ni)). Fertilizers are broadly divided into organic fertilizers (composed of organic plant or animal matter), or inorganic or commercial fertilizers. Inorganic fertilizers include: ammonium nitrate, ammonium sulfate, ammonium thiosulfate, calcium ammonium nitrate, calcium nitrate, diammonium phosphate, monocalcium phosphate, potassium chloride, potassium nitrate, potassium sulfate and thermopotash. Organic fertilizers include: azomite, bioeffector, biofertilizer, compost, cottonseed meal, effluent spreading, feather meal, fish emulsion, fish hydrolysate, fish meal, manure, maxicrop, olive mill pomace, riverm, rockdust, seaweed fertilizer and slurry pit.

According to an embodiment, in agriculture, pesticides are used to limit damages caused by pests and stimulate growth, and can be used in combination with fertilizers.

It is well within the skill of the person skilled in the art to determine how much of any given fertilizer may be added to the compositions of the present invention in order to obtain the fertilizing effect desired.

Methods of Use and Use of the Formulations

In a further embodiment, there is disclosed a method comprising the step of further diluting the aqueous nano-emulsion formulation with water. Since the disinfectant nano-emulsion formulations are typically prepared on site from mixtures of ingredients in concentrated solution, water is used for further dilutions as needed.

In another embodiment, the disinfectant nano-emulsion formulation of the present invention may be used for cleaning of surfaces by contacting the surfaces with an amount of the aqueous nano-emulsion formulation of the present invention.

The aqueous nano-emulsion formulation of the present invention may be applied onto a surface in need of disinfecting by means of a variety of spraying techniques. In an embodiment, the aqueous nano-emulsion formulation of the present invention is applied using a diffuser or a mist blower. Alternatively, the nano-emulsion formulation of the present invention can also be formulated into aerosol formulations. Further means of applying the nano-emulsion solutions of the present invention are within the capacity of a skilled technician. The nano-emulsion formulations of the present invention can either be applied directly or can be diluted prior to application. Due to the substantially non-corrosive nature of the nano-emulsion formulations of the present invention, the formulations can be readily applied without undue damage to the existing physical structure (i.e. surface).

In an embodiment, there is disclosed a method for the control of pests of a seed or a plant, the method comprising contacting the seed or plant with a pesticidal amount of the aqueous nano-emulsion formulation of the present invention. The aqueous nano-emulsion formulation of the present invention may be used for soil disinfection (fungicide, bactericide, virucide), as well as vegetable, plant and vegetal matter disinfection, which include as non-limiting examples seeds, grains, plants, trees, bushes, roots, foliage, weed, fruits, flowers, crops, graftings, and the likes. The aqueous nano-emulsion formulation of the present inventions may also be used as insect repellents, arthropod repellents, pesticides, insecticides, nematicides, acaricides, ovicides, larvicides and adulticides.

Crops with which the composition of the present invention may be used include, for example, but are not limited to banana, apple, pear, potato, rice, coffee, citrus, onions, ginseng, soy, weed, and tomato.

According to another embodiment there is also disclosed a method for regulating growth of a seed or a plant, the method comprising contacting the seed or plant with a growth regulating amount of the aqueous nano-emulsion formulation of the present invention. According to yet another embodiment, there is disclosed method for regulating the growth of a plant, the method comprising contacting a soil, a seed, a plant, or combinations thereof, with a growth regulating amount of the aqueous nano-emulsion formulation of the present invention.

According to an embodiment, regulating the growth comprises an increase in the number of fruit vegetable, bulb or tuber from the plant. According to another embodiment, regulating the growth comprises an increase in the size of fruit, vegetable, bulb or tuber from the plant. According to another embodiment, regulating the growth comprises an increase in the number of healthy plants. In another embodiment, regulating the growth may be of particular importance to plants whose foliage of particular interest, such as lettuce or other varieties of plants whose leaves are edible. According to another embodiment, regulating the growth comprises a stimulation of fruit ripening. According to another embodiment, regulating the growth comprises inhibition of plant and shoot growth. According to another embodiment, regulating the growth an increase in flowering. According to another embodiment, regulating the growth comprises the regulation of leaf and fruit senescence.

The present invention will be more readily understood by referring to the following examples which are given to illustrate the invention rather than to limit its scope.

EXAMPLE 1

Evaluation of Micelle Size of Antimicrobial Nano-Emulsion Using *Quillaja* and Potassium Sorbate as Co-Surfactant The aim of this example is to evaluate the size of micelles of the aqueous nano-emulsion formulation of the present invention compared to a nano-emulsion made using previous technology.

The anti-microbial nano-emulsion of the present invention was obtained by first mixing the solvents, *Quillaja* and potassium sorbate until equilibrium is reached. The thyme oil was consecutively added slowly to maintain a persistent and continuous solubility. The final formulation was then agitated until a transparent homogenate solution, representing the formation of small nano-emulsions, was obtained. The resulting formulation was analyzed under a microscope at 40× magnification and compared with images of a nano-emulsion made with sodium lauryl sulfate (SLS).

Figure 1B:
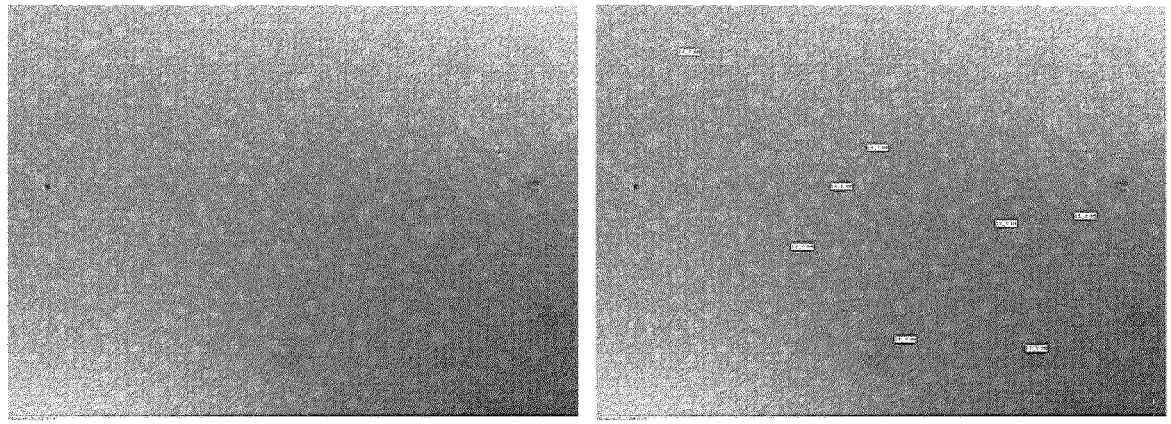
FIG. 1B illustrates the size of micelles in the aqueous disinfectant formulation of the present invention compared to previous technologies.

FIGS. 1A-B show that the nano-emulsions produced with the formulations of the present invention result in the formation of very small micelles having a diameter range from about 10 nm to about 30 nm (right image is the same image as left, but with scale bars added). Particularly, FIG. 1A are electron micrographs of Thymox™ Control, a formulation according to the present invention [Ready to Use (RTU); dilution 1/200]with magnification of 60 000× showing a nano-emulsions sizes ranging from about 29 to about 33 nm, for example. FIG. 1B are electron micrographs of Thymox™ Control, a formulation according to the present invention (RTU; dilution 1/200) with magnification of 100 000× showing a nano-emulsions sizes as small as 10 nm (right image is the same image as left, but with scale bars added).

EXAMPLE 2

Antibacterial Effects of Antimicrobial Nano-Emulsions Containing Thyme Oil According to the Present Invention Various formulations were prepared by varying the ingredients in the composition, as well as their concentration. The compositions of the various aqueous nano-emulsion formulations prepared and tested are presented in Table 5.

TABLE 5

Aqueous formulations prepared and tested

| Ingredients | F1 | F2 | F3 | F4 | F5 | F6 | F7 | F8 | F9 | F10 | F11 |
|---|---|---|---|---|---|---|---|---|---|---|---|
| Thyme oil | 23 | 23 | 23 | 23 | 23 | 23 | 23 | 23 | 23 | 23 | 23 |
| Isopropanol | 14 | 14 | 14 | | | 14 | 14 | 14 | 14 | 14 | 14 |
| N-butyl Lactate | 43 | 28 | | | | | | | 5 | | |
| Oleate | 20 | 20 | | | | 30 | | 40 | 48 | | 20 |
| Sodium Lauryl Sulphate | | | 48 | 41 | 36 | | 50 | | | | |
| Citric Acid | | | | 1 | | | 3 | | | | |
| Potassium Sorbate | | | | | | | 10 | | | | |
| PGME | | | | | 36 | | | | | | |

TABLE 5-continued

Aqueous formulations prepared and tested

| Ingredients | | | | | | | | | | | |
|---|---|---|---|---|---|---|---|---|---|---|---|
| Glucopon 420 UP | | | | | 41 | | | | | | |
| Glycerol | | | | | | 15 | | 10 | | | |
| 3% Quillaja + 1% Citric Acid + 96% H₂O | | | | | | | | | | | |
| Lecithin | | | | | | | | | | 48 | 35 |
| H₂O | | 15 | 14 | | | 18 | 0 | 13 | 10 | 15 | 8 |
| Total | 100 | 100 | 100 | 100 | 100 | 100 | 100 | 100 | 100 | 100 | 100 |

Compositions of formulations based on w/w %

| Ingredients | F12 | F13 | F14 | F15 | F16 | F17 | F18 | F19 | F20 | F25 |
|---|---|---|---|---|---|---|---|---|---|---|
| Thyme oil | 23 | 23 | 23 | 23 | 25 | 40 | 40 | 40 | 40 | 27 |
| Isopropanol | 14 | 14 | 14 | 7.5 | 15 | 7.5 | | | 3.5 | 4.3 |
| N-butyl Lactate | 51.6 | 7.5 | 14 | | 28 | 14 | 12 | 13.5 | 13 | 15.8 |
| Oleate | 10 | 40.5 | | | 12 | | | 33 | | 0 |
| Sodium Lauryl Sulphate | | | 48 | | | | | | | |
| Citric Acid | 1.4 | | 1.4 | | | | | | | |
| Potassium Sorbate | | | | | | 10 | 20 | | 15 | 18.3 |
| PGME | | | | | | | | | | 0 |
| Glucopon 420 UP | | | | | | | | | | 0 |
| Glycerol | | | | 5 | 10 | 18.5 | 19 | 5 | 18.5 | 22.5 |
| 3% Quillaja + 1% Citric Acid + 96% H₂O | | | | 5 | 10 | 10 | 9 | 5 | | 12.1 |
| Lecithin | | | | | | | | | | 0 |
| H₂O | | 15 | 13.6 | 45.5 | | | | | 10 | 0 |
| Total | 100 | 100 | 100 | 100 | 100 | 100 | 100 | 100 | 100 | 100 |

The antibacterial efficacy of the aqueous nano-emulsion formulations of the present invention was tested in vitro following the United States Environmental Protection Agency (EPA) standards. Bacteria (*Staphylococcus aureus*) were exposed to each formulation for 30 seconds following incubation at 37° C. for 24 hours. The day after, the colonies were counted and the results were expressed in a logarithmic scale as a reduction in number of colonies compared to a positive control with known bactericidal effects.

Figure 2:
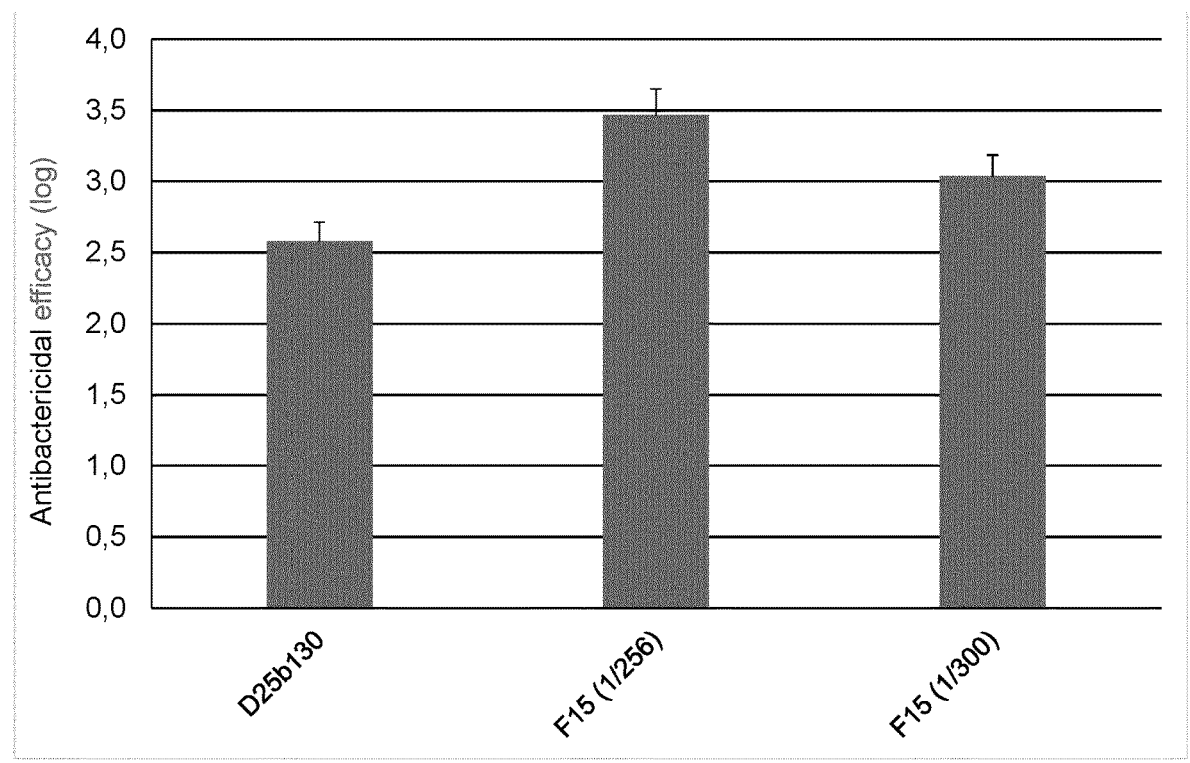
FIG. 2 illustrates the antibacterial efficacy of the aqueous disinfectant formulation of the present invention made with natural thyme oil and synthetic thymol crystals.

Referring to FIG. 2, the antibacterial effect of the nano-emulsion formulations containing thyme oil from a natural source (i.e. the F15 (1/256) and F15 (1/300) formulations) was first tested and compared to a similar formulation made with synthetic thymol crystals as positive control (i.e. the D25b130 formulation containing 23% w/w thymol crystal, 14% w/w isopropanol, 48% w/w SLS, 1.4% w/w citric acid, and 13.6% w/w H₂O). As seen, the F15 (1/256) and F15 (1/300) formulations containing natural thyme oil both demonstrated a greater antibacterial efficacy as compared to the D25b130 formulation positive control containing synthetic thymol crystals.

Figure 3:
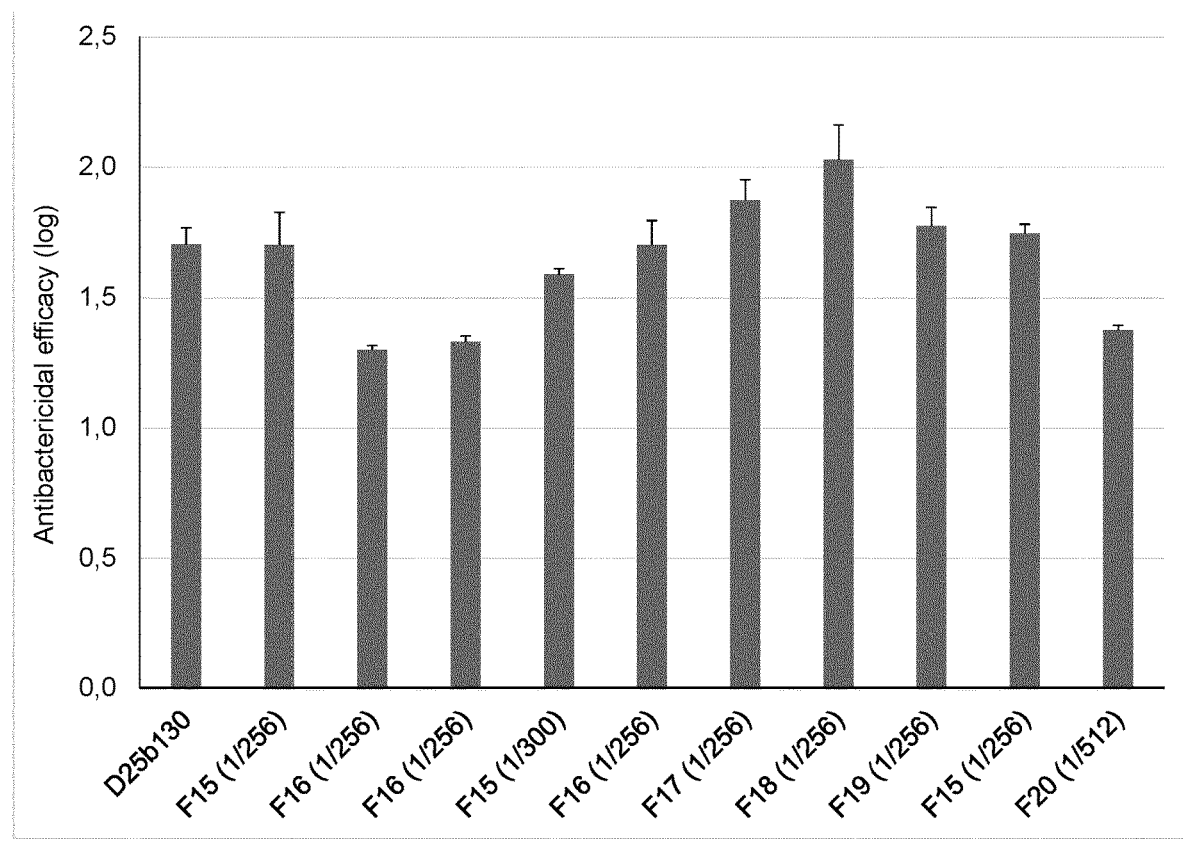
FIG. 3 illustrates the antibacterial efficacy of aqueous disinfectant formulations having different compositions.

Referring to FIG. 3, the antibacterial efficacy of various antimicrobial nano-emulsion formulations, as described in Table 5, were also tested. As seen, the F17 (1/256) and F18 (1/256) both containing *Quillaja* and Potassium Sorbate as co-surfactant had the greatest antibacterial efficacy as compared to the other formulations tested.

Figure 4:
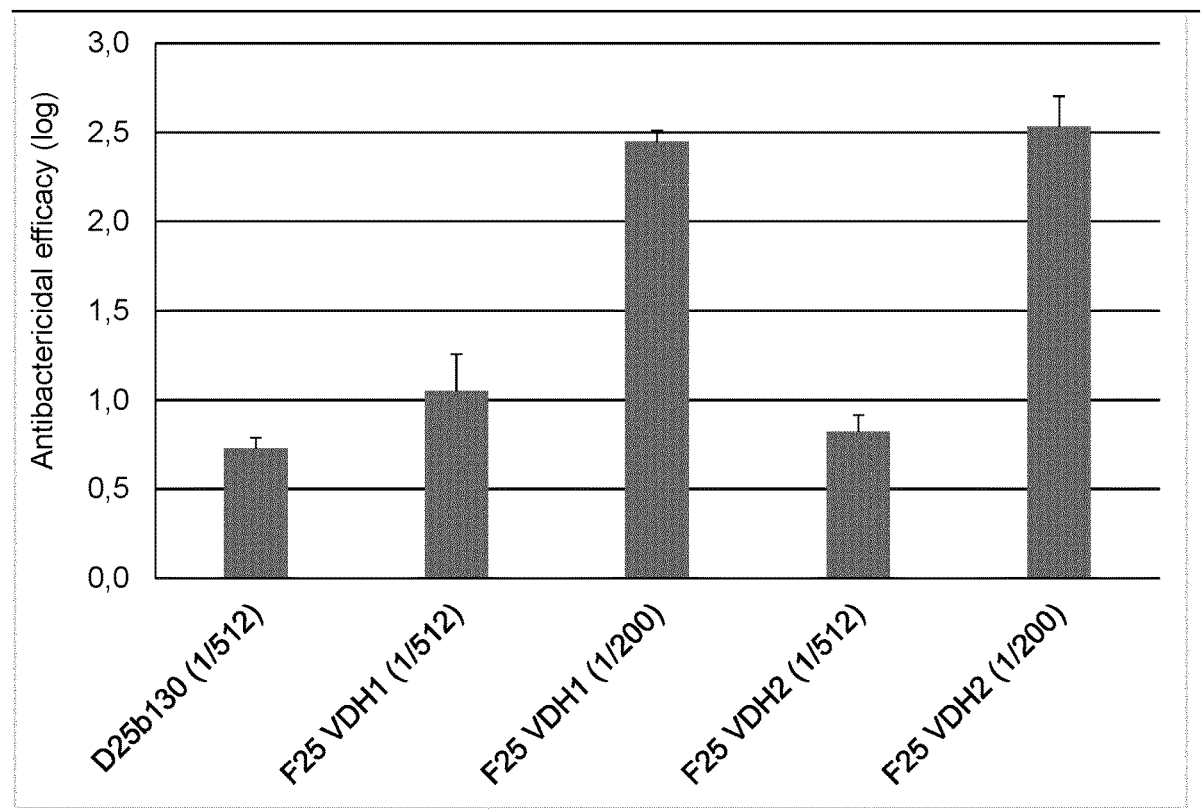
FIG. 4 illustrates the antibacterial efficacy of aqueous disinfectant formulations based on natural-identical synthetic thyme oils.

Referring to FIG. 4, the antibacterial efficacy of aqueous nano-emulsion formulations based on the F25 formulation comprising natural-identical synthetic thyme oils VDH-1 and VDH-2 were also tested. The VDH oils are Nature Identical Essential Oils, which are copies of true essential oils which use identical components isolated from alternative natural sources. They are synthetic oils, having the identical chemical build-up as the ones from the plant. As seen, the F25 (VDH1 (1/200)) and F25 (VDH2 (1/200)) formulations both demonstrated a greater antibacterial efficacy as compared to the D25b130 formulation positive control containing synthetic thymol crystals.

EXAMPLE 3

Antibacterial Effects of Antimicrobial Nano-Emulsions Containing Oregano Oil(s) According to the Present Invention To demonstrate the versatility of the nano-emulsions of the present invention with various antimicrobial essential oils, three nano-emulsions were prepared based on the F25 formulation of Table 5 above, but using as active ingredient one or both of the two oregano oils listed in Table 6 below. Particularly, a KEM1 nano-emulsion was prepared with Oregano Hi Carvacrol essential oil at a final concentration of 27%, a KEM2 nano-emulsion was prepared with Oregano Hi Thymol essential oil at a final concentration of 27%, and a KEM3 nano-emulsion was prepared with Oregano Hi Carvacrol essential oil at a final concentration of 13.5% and Oregano Hi Thymol essential oil at a final concentration of 13.5% (resulting in a final concentration of 27% of total Oregano essential oils). All formulations were mixed at room temperature for 5 hours. After reaching stability, proper stability properties was confirmed by incubating 2 samples of each of the 3 nano-emulsions at room temperature or at 54° C. Working solutions for testing antibacterial activity tests (as described below) were then prepared by diluting 1 mL from each concentrate formulation in 199 mL of water to give a final dilution of 1/200 (v/v).

TABLE 6

Oregano essential oils used for the preparation of antimicrobial nano-emulsion according to the present invention

| Oregano Essential Oils | Pesticide Properties |
|---|---|
| Oregano Hi Carvacrol (84% Carvacrol content; from KEMIN) | Bactericide, Fungicide |
| Oregano Hi Thymol (86% Thymol content; from KEMIN) | Bactericide, Fungicide |

EPA Spray Test Assay

To assess antibacterial activity, the KEM1, KEM2, and KEM3 nano-emulsions were submitted to a spray test following the United States Environmental Protection Agency (EPA) standards. In this test, the KEM1, KEM2, and KEM3 nano-emulsions are sprayed on cover slips preloaded with *Staphylococcus aureus* and the coverslips are incubated in tubes containing culturing medium. After 2 days of culture, the number of tubes that is free of *Staphylococcus aureus* growth is expressed as a percentage representing the antibacterial efficacy of the KEM1, KEM2, and KEM3 formulations. The positive control condition used commercially available CO-LCL (Thymox-CO), which had a final thymol concentration of 0.207%. CO-LCL is a control product made of thymol crystal (i.e. not oil-based), solvent [Propylene glycol methyl ether (PGME)] and surfactant [sodium lauryl sulphate (SLS)].

Figure 5:
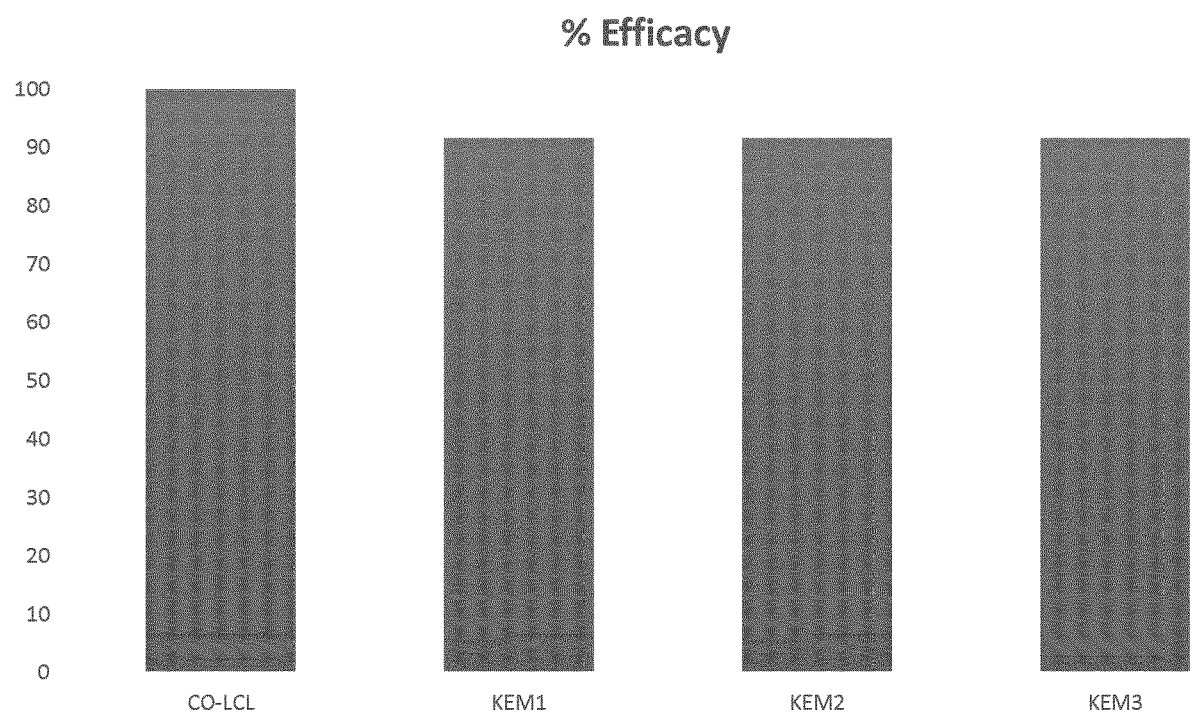
FIG. 5 illustrates the antibacterial efficacy of aqueous disinfectant formulations based on oregano essential oils.

As shown in FIG. 5, all three KEM1, KEM2, and KEM3 nano-emulsions displayed a very high antibacterial efficacy during the spray test assay and were generally comparable to the positive control.

Petri-Counted Dry Anti-Microbial Test (PAMB)

To further assess antibacterial activity, the KEM1, KEM2, and KEM3 nano-emulsions were submitted to a quantitative test that compares the effectiveness of a given nano-emulsion based on its capacity to prevent bacterial colony formation, the so-called Petri-Counted Dry Anti-Microbial test (PAMB). Briefly, the KEM1, KEM2 and KEM3 nano-emulsions were added to petri dishes inoculated with $10^6$ *Staphylococcus aureus* and the logarithmic reduction in the number of colonies were counted after a 24-hour incubation period, where a higher log reduction represents a higher antibacterial activity. The positive control condition again used commercially available CO-LCL, which also had a final thymol concentration of 0.207%.

Figure 6:
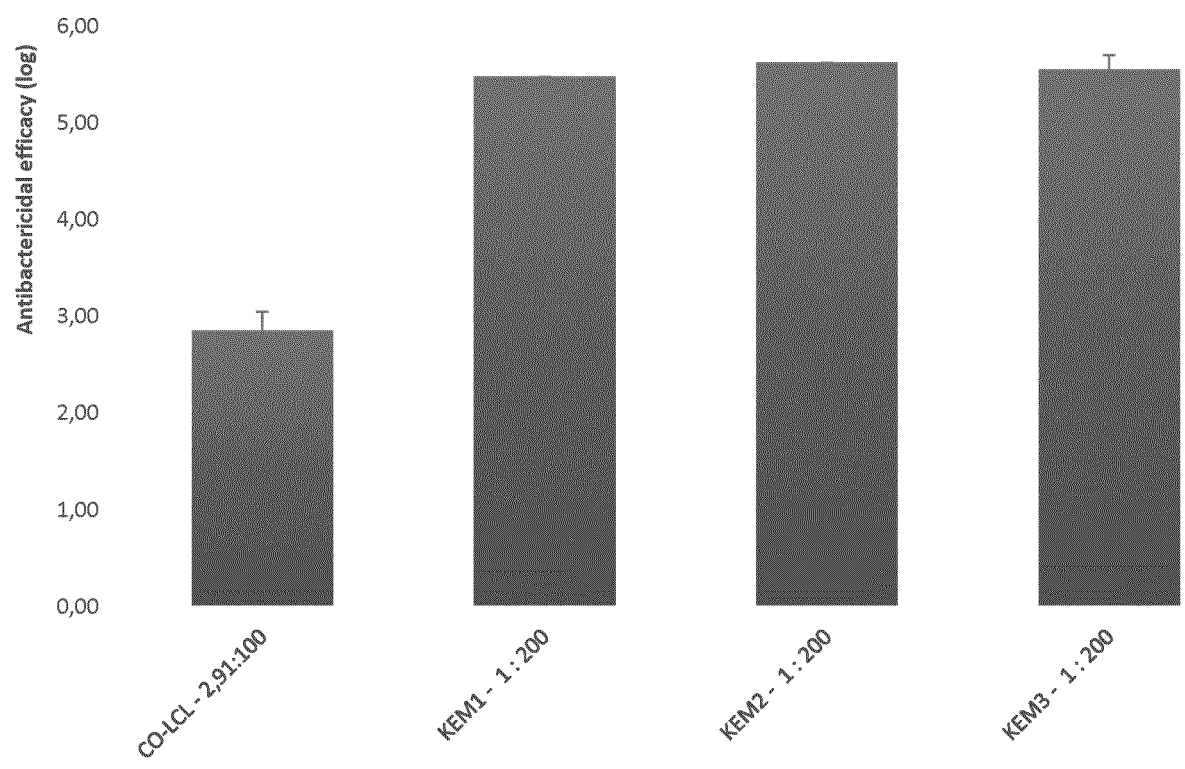
FIG. 6 illustrates the antibacterial efficacy of aqueous disinfectant formulations based on oregano essential oils.

As shown in FIG. 6, the CO-LCL positive control elicited a 2.85 log-reduction score, while all three KEM1, KEM2, and KEM3 formulations elicited a significantly higher antibacterial efficacy with a nearly 5.50 log-reduction score, highlining the superior antimicrobial activity of the KEM1, KEM2, and KEM3 nano-emulsion over the CO-LCL positive control.

EXAMPLE 4

Antibacterial Effects of Antimicrobial Nano-Emulsions Containing Other Essential Oil Source(s) According to the Present Invention To further demonstrate the versatility of the nano-emulsions of the present invention with respect to antimicrobial essential oils, various other nano-emulsions were prepared based on the formulation of Table 7.

TABLE 7

Formulation used to produce the nano-emulsions of the present invention with essential oil(s) other than thyme oil and oregano oil

| Ingredients | W/V % |
| --- | --- |
| Essential Oil | 15 |
| Glycerol | 27 |
| Isopropanol | 4.5 |
| Butyl Lactate | 25 |

TABLE 7-continued

Formulation used to produce the nano-emulsions of the present invention with essential oil(s) other than thyme oil and oregano oil

| Ingredients | W/V % |
| --- | --- |
| Potassium Sorbate | 18.5 |
| 3% *Quillaja* + 1% Citric Acid + 96% $H_2O$ | 10 |
| Total | 100 |

Exemplary sources of essential oils that may be used to prepare the nano-emulsion formulation of Table 7 are shown in Table 8. These essential oils, which may be for example rosemary oil, cinnamaldehyde, and/or citral, have mostly insecticide and miticide properties and are used in the industry, household or agriculture.

TABLE 8

Exemplary essential oil sources that may be used to produce the nano-emulsion formulations of Table 7

| Essential Oils | Pesticide Property |
| --- | --- |
| Rosemary-1 (KEMIN) | Insecticide/Miticide |
| Rosemary-2 (KEMIN) | Insecticide/Miticide |
| KEMIN Blend | Insecticide/Miticide |
| Rosemary (Rakesh) | Insecticide/Miticide |
| Rosemary (Katyani) | Insecticide/Miticide |
| Rosemary (Nature Natural) | Insecticide/Miticide |
| Cinnamaldehyde (Sigma-Aldrich) | Insecticide, Bactericide |
| Citral (Sigma-Aldrich) | Insecticide, Bactericide |

As examples of nano-emulsions that may be prepared with essential oils other than thyme oil and oregano oil, two nano-emulsions were prepared based on the formulation of Table 7 using as active ingredient rosemary oil rosemary-1 or rosemary-2 of Table 8, which were each diluted to 0.5% in water prior to use. The nano-emulsions so prepared were submitted to a miticide bioassay to assess their respective insecticidal and/or miticidal properties. Ten second instar adult mites were placed onto leaf disks and separately treated with each of the nano-emulsion. The positive control condition used commercially available Competitive Control (CC), Tetracurb™-B (TC-B) and Tetracurb™-E (TC-E) (from Kemin). The negative control condition was not sprayed to confirm proper handling and arena setup. Bioassays were scored following a 24-hour incubation time where dead/alive mites count were recorded to determine the percent mortality and hence the antimicrobial activity of the nano-emulsions prepared with rosemary-1 or rosemary-2. Assays were replicated 6 times (N=60).

Figure 7:
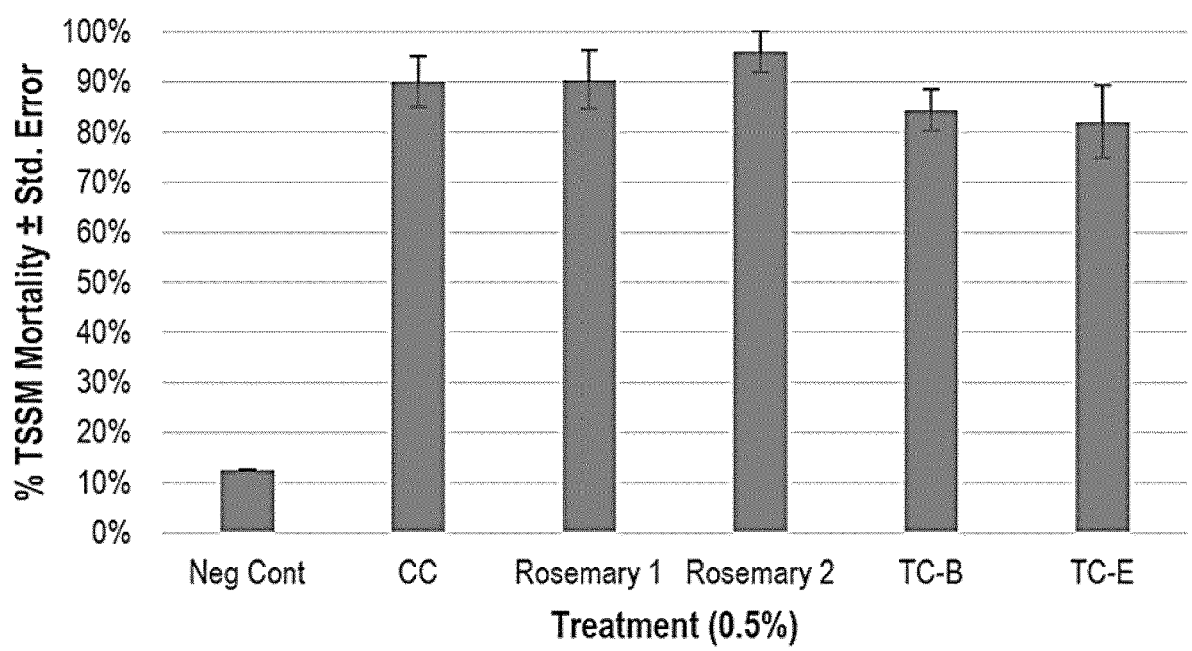
FIG. 7 illustrates the antibacterial efficacy of aqueous disinfectant formulations based on rosemary essential oils.

As shown in FIG. 7, the nano-emulsions containing rosemary-1 and rosemary-2 both elicited a two-spotted spider mite (TSSM) mortality rate above the negative control condition and equal or superior to the positive control condition, with the nano-emulsion containing rosemary-2 having the highest TSSM mortality.

EXAMPLE 5

Evaluation of the Synergistic Antibacterial Effects of Antimicrobial Nano-Emulsions According to the Present Invention Antimicrobial Nano-Emulsion formulations were prepared by varying the ingredients in the composition, as well as their concentration. The composition of the various aqueous nano-emulsion formulations prepared and tested are presented in Table 9. The antibacterial efficacy of the aqueous nano-emulsion formulations of the present invention was tested in vitro following the United States Environmental Protection Agency (EPA) standards. Bacteria (*Staphylococcus aureus*) were exposed to each formulation for 30 seconds following incubation at 37° C. for 24 hours. The day after, the colonies were counted and the results were expressed in a logarithmic scale as a reduction in number of colonies compared to a positive control with known bactericidal effects.

TABLE 9

Antimicrobial formulations prepared and tested in the present invention to assess synergistic effects

| Ingredients % (w/w) | F (10S + 0Q) | F (0S + 10Q) | F (10S + 10Q) | F (15S + 10Q) | F (28O + 10Q) | F (35O + 10Q) |
|---|---|---|---|---|---|---|
| Thyme oil | 40 | 40 | 40 | 40 | 40 | 40 |
| Glycerol | 18.5 | 18.5 | 18.5 | 18.5 | 5 | 5 |
| Isopropanol | 7.5 | 7.5 | 7.5 | 3.5 | 3.5 | 0 |
| Butyl Lactate | 14 | 14 | 14 | 13 | 13.5 | 10 |
| Potassium Sorbate | 10 | 0 | 10 | 15 | — | — |
| 3% Quillaja + 1% citric acid + 96% H₂O | 0 | 10 | 10 | 10 | 10 | 10 |
| Oleate | — | — | — | — | 28 | 35 |
| Citric Acid 1% | 10 | 10 | 0 | 0 | 0 | 0 |
| Total | 100 | 100 | 100 | 100 | 100 | 100 |

Figure 8:
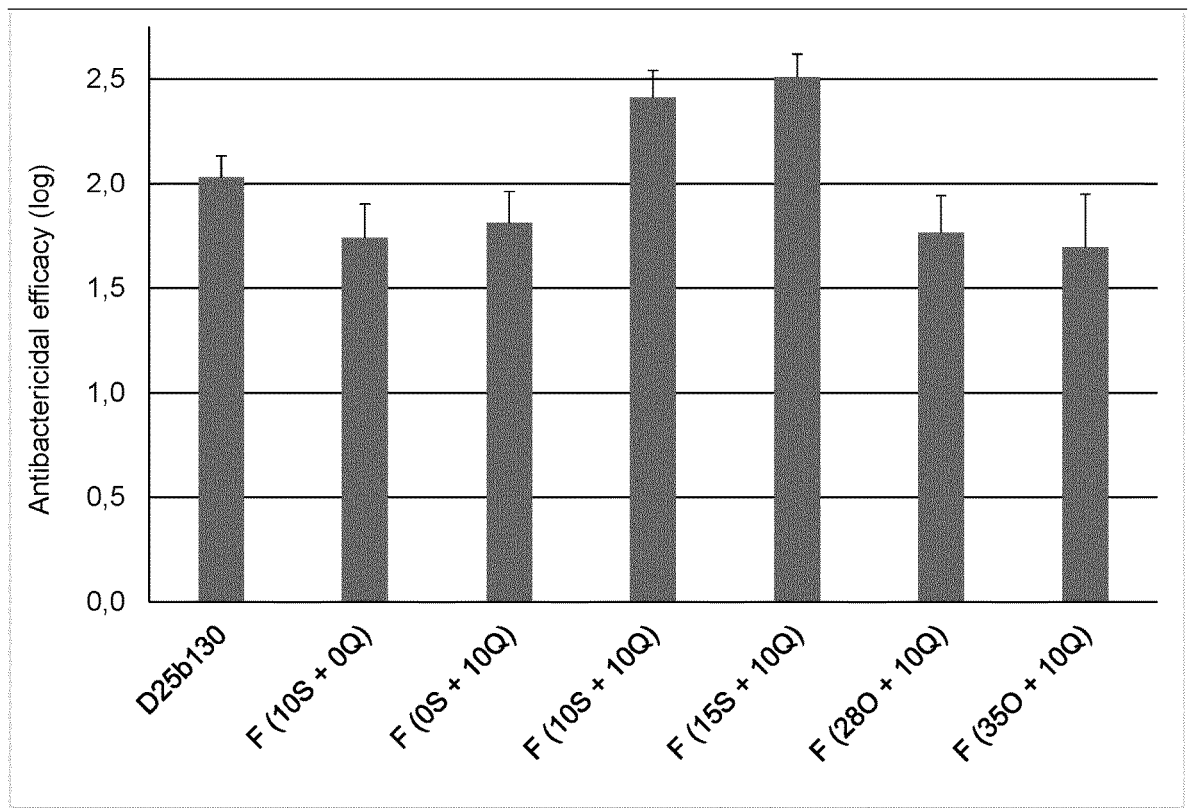
FIG. 8 illustrates the antibacterial efficacy of aqueous disinfectant formulations based on natural-identical synthetic thyme oils according to embodiments of the present invention.

Referring to FIG. 8, there is shown the synergic effects of combining potassium sorbate (S) and *Quillaja* extract (Q) on the antimicrobial efficacy of the tested formulations. Oleate (O) was used as an alternative control for potassium sorbate. The results show that formulations comprising either only potassium sorbate or *Quillaja* extract [F(10S+0Q) and F(0S+10Q)], and the formulations where potassium sorbate is replaced by oleate [i.e. F(28O+10Q) and F(35O+10Q)], performed worse than the positive control D25b130 formulation (i.e. 23% w/w thymol crystal, 14% w/w isopropanol, 48% w/w SLS, 1.4% w/w citric acid, 13.6% w/w H₂O). Surprisingly, the combination of increasing concentrations of potassium sorbate with *Quillaja* extract displayed much improved antimicrobial efficacy for which about 0.5 log (about 3.2×) over the positive control D25b130 formulation and more than 0.75 log (about 5.6×) over the formulations that comprised potassium sorbate or *Quillaja* extract alone clearly demonstrate a synergistic effect of the combinations of these ingredients in the formulation of the present invention.

EXAMPLE 6

Further Evaluation of the Synergistic Antibacterial Effects of Antimicrobial Nano-Emulsions According to the Present Invention To further characterize the synergistic effect of combining *Quillaja* extract and potassium sorbate, antibacterial nano-emulsion formulations were prepared by varying the ingredients in the composition, as well as their concentration. The composition of the various aqueous nano-emulsion formulations prepared and tested are presented in Table 10. The antibacterial efficacy of the aqueous nano-emulsion formulations of the present invention was tested in vitro following the United States Environmental Protection Agency (EPA) standards. Bacteria (*Staphylococcus aureus*) were exposed to each formulation for 30 seconds following incubation at 37° C. for 24 hours. The day after, the colonies were counted and the results were expressed in a logarithmic scale as a reduction in number of colonies compared to a positive control with known bactericidal effects.

TABLE 10

Antimicrobial formulations tested to assess synergistic effect

| Ingredients | FS1 | FS2 | FS3 | FS4 | FS5 | FS6 | FS7 | FS8 | FS9 | FS10 | FS11 |
|---|---|---|---|---|---|---|---|---|---|---|---|
| Thyme VDH2 | 40 | 40 | 40 | 40 | 40 | 40 | 40 | 40 | 40 | 40 | 40 |
| IP | 7.5 | 7.5 | 7.5 | 7.5 | 7.5 | 7.5 | 7.5 | 4 | 7.5 | 7.5 | 7.5 |
| Butyl | 14 | 14 | 14 | 14 | 14 | 14 | 14 | 13 | 14 | 14 | 14 |
| Quillaja | 15 | 5 | 10 | 5 | 5 | 5 | 10 | 15 | 20 | 20 | 0 |
| Glycerol | 13.5 | 20 | 8.5 | 18.5 | 15 | 10 | 3.5 | 3 | 8.5 | 13.5 | 20 |
| Citric acid | 0 | 0 | 0 | 0 | 0 | 0 | 0 | 0 | 0 | 0 | 0 |
| Sorbate | 10 | 10 | 20 | 0 | 15 | 20 | 25 | 25 | 10 | 5 | 5 |
| H₂O | 0 | 3.5 | 0 | 2.5 | 0 | 0 | 0 | 0 | 0 | 0 | 13.5 |
| Oleate | 0 | 0 | 0 | 12.5 | 3.5 | 3.5 | 0 | 0 | 0 | 0 | 0 |
| Total | 100 | 100 | 100 | 100 | 100 | 100 | 100 | 100 | 100 | 100 | 100 |

TABLE 11

Antimicrobial effect of tested formulations - concentrate
Concentrate

|  | FS1 | FS2 | FS3 | FS4 | FS5 | FS6 | FS7 | FS8 | FS9 | FS10 | FS11 |
|---|---|---|---|---|---|---|---|---|---|---|---|
| Sorbate/Quillaja | 0.7 | 2.0 | 2.0 | 0.0 | 3.0 | 4.0 | 2.5 | 1.7 | 0.5 | 0.3 | 0 |
| Log Reduction | 3.1 | 3.0 | 2.5 | 1.8 | 2.5 | 2.4 | 2.0 | 2.1 | 2.2 | 2.7 | 1.6 |
| Fold increase compared to FS4 | 20 | 15.8 | 5 | 0 | 5 | 4 | 1.6 | 2 | 2.5 | 7.9 | — |
| Fold increase compared to FS11 | 32 | 25 | 8 | — | 8 | 6.3 | 2.5 | 3 | 8 | 12.6 | 0 |

TABLE 12

Antimicrobial effect of tested formulations - 1/256 dilution
Dilution 1/256

|  | FS1 | FS2 | FS3 | FS4 | FS5 | FS6 | FS7 | FS8 | FS9 | FS10 | FS11 |
|---|---|---|---|---|---|---|---|---|---|---|---|
| Sorbate/Quillaja | 0.7 | 2.0 | 2.0 | 0.0 | 3.0 | 4.0 | 2.5 | 1.7 | 0.5 | 0.3 | 0 |
| Log Reduction | 2.97 | 2.86 | 2.67 | 2.06 | 2.52 | 2.84 | 2.98 | 3.00 | 2.70 | 2.91 | 1.8 |
| Fold increase compared to FS4 | 8.1 | 6.3 | 4.1 | 0 | 2.9 | 6 | 8.3 | 8.7 | 4.4 | 7.1 | — |
| Fold increase compared to FS11 | 14.8 | 11.5 | 7.4 | — | 5.2 | 11 | 15 | 15.8 | 7.9 | 12.9 | 0 |

TABLE 13

Antimicrobial effect of tested formulations - 1/512 dilution
Dilution 1/512

|  | FS1 | FS2 | FS3 | FS4 | FS5 | FS6 | FS7 | FS8 | FS9 | FS10 | FS11 |
|---|---|---|---|---|---|---|---|---|---|---|---|
| Sorbate/Quillaja | 0.7 | 2.0 | 2.0 | 0.0 | 3.0 | 4.0 | 2.5 | 1.7 | 0.5 | 0.3 | 0 |
| Log Reduction | 1.32 | 1.19 | 1.15 | 1.01 | 1.49 | 1.42 | 1.57 | 1.29 | 1.44 | 1.30 | 0.9 |
| Fold increase compared to FS4 | 2 | 1.5 | 1.4 | 0 | 3 | 2.6 | 3.6 | 1.9 | 2.7 | 1.9 | — |
| Fold increase compared to FS11 | 2.6 | 1.9 | 1.8 | — | 3.9 | 3.3 | 4.7 | 2.5 | 3.5 | 2.5 | 0 |

Figure 9:
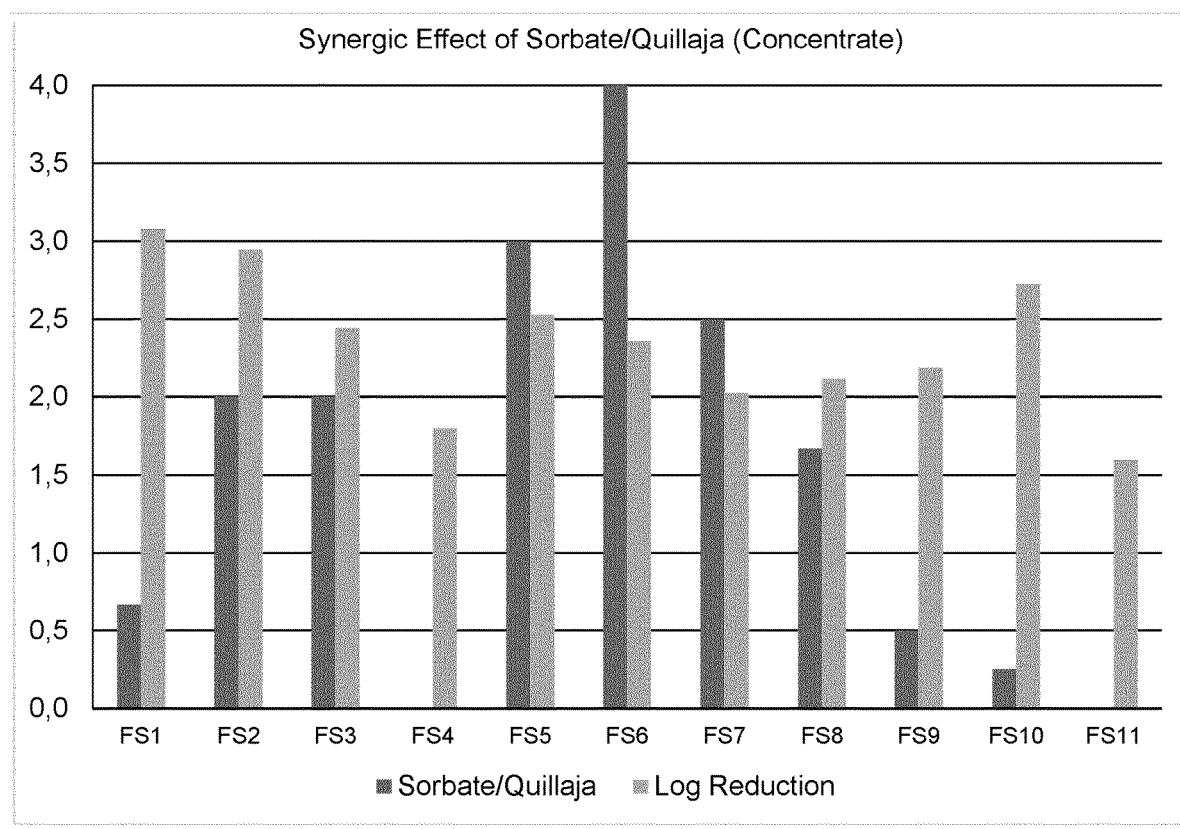
FIG. 9 illustrates the antibacterial efficacy of aqueous disinfectant formulations based on natural-identical synthetic thyme oils according to embodiments of the present invention, used as a concentrate.
Figure 10:
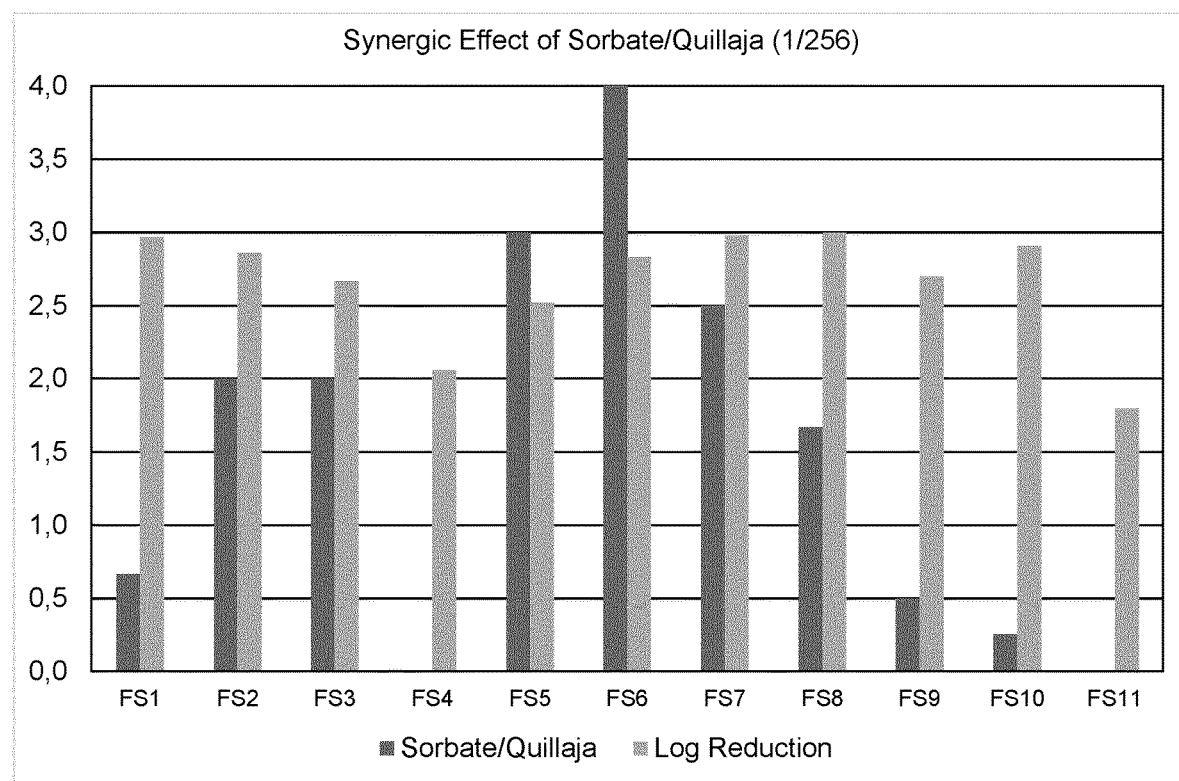
FIG. 10 illustrates the antibacterial efficacy of aqueous disinfectant formulations based on natural-identical synthetic thyme oils according to embodiments of the present invention, used as a 1/256 dilution.
Figure 11:
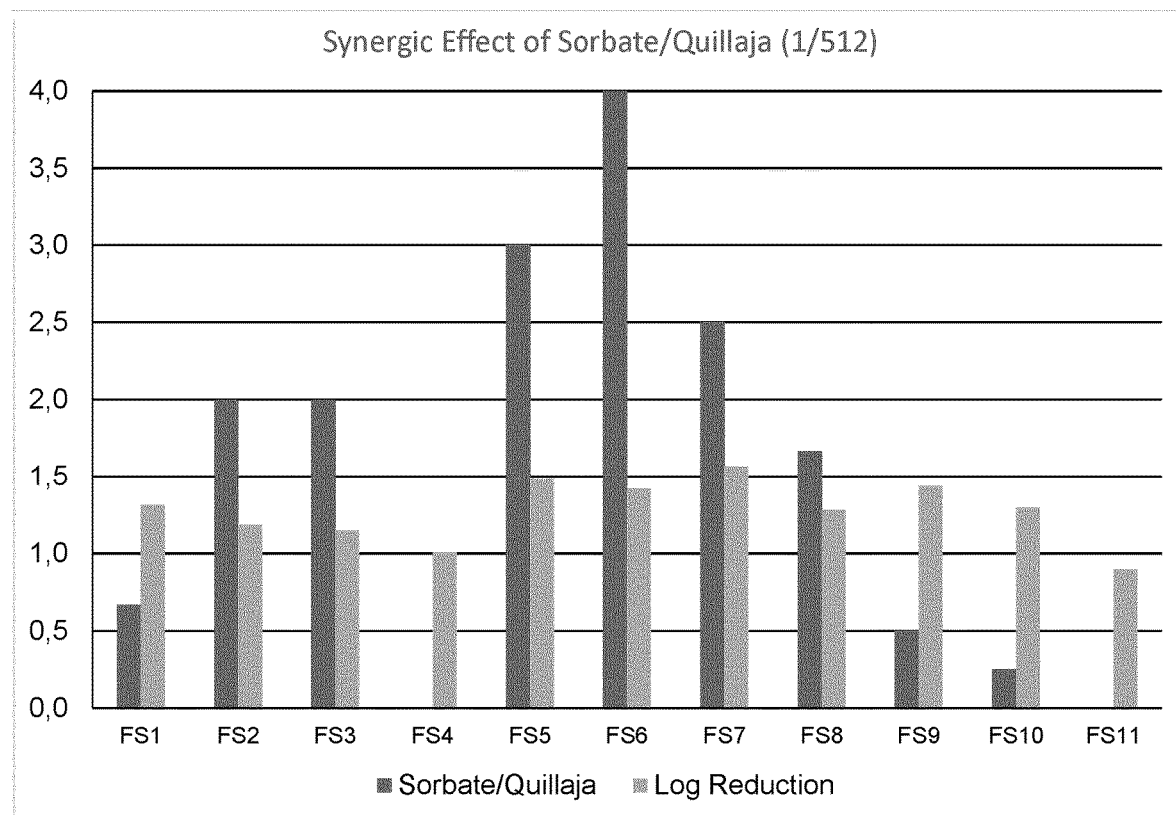
FIG. 11 illustrates the antibacterial efficacy of aqueous disinfectant formulations based on natural-identical synthetic thyme oils according to embodiments of the present invention, used as a 1/512 dilution.

Referring to FIGS. 9 to 11 and Tables 11 to 13, the presented results shows the synergic effects of combining potassium sorbate and *Quillaja* extract (provided therein as the percentage of a 3% *Quillaja*+1% Citric Acid+96% $H_2O$ concentrate) at difference concentrations on the antimicrobial efficacy of the tested formulations. Oleate was used as an alternative control for potassium sorbate, as well as an additional ingredient in the FS5 and FS6 formulations, for improving stability of these formulations. The results show that formulations comprising either no potassium sorbate (i.e. the FS4 formulation) or no *Quillaja* extract (i.e. the FS11 formulation), performed worse than any of the other formulations and served as reference data points for normalization of the results. The ratios of the percentages of sorbate over *Quillaja* extract are presented in Tables 11 to 13.

FIGS. 9 to 11 also show graphically these ratios, as well as present the log reduction for each formulation compared to the FS4 formulation. In Tables 11 to 13, the fold increase in reduction as compared to the FS4 and FS11 formulations is presented, for each of the concentrated formulations tested directly and the 1/256 and 1/512 dilutions. Surprisingly, all concentrated formulations displayed strong synergy between potassium sorbate and *Quillaja* extract, as did all formulations diluted at 1/256. Most formulations diluted at 1/512 also displayed a synergistic behavior.

EXAMPLE 7

Use Against Fire Blight of Apples Using a Detached Flower Assay for Blossom Infection The aim of this example is to test the potential of antibacterial nano-emulsions containing thyme oil of the present invention against fire blight and to compare the results obtained with results obtained with streptomycin, which is an industry standard.

Fire blight caused by *Erwinia amylovora* is the most devastating disease of both apple and pears. In most circumstances, infections during bloom through the nectary of flowers are the greatest concern. Control strategies usually aim to protect flowers with substances antagonistic to bacteria when conditions of temperature and humidity during bloom favor infection.

In many parts of the world, bactericides such as streptomycin are routinely sprayed during bloom for this purpose. However, growing concerns about the use of such compound and the spread of resistant bacteria strains have led to efforts to find alternatives that are both cost effective and acceptable for different markets, including organic agriculture. Detached flowers assays (Pusey 1997) have been shown to be an efficient method to screen potential preparations. The blossom test closely replicates natural infections and previous results have shown a strong correlation with field data (Kunz and Haug 2006).

Materials and Methods

Refrigerated dormant 2-year potted apple trees (cv Gala) were forced to bloom at room temperature in late March 2019. Fresh individual flowers were handpicked as they bloomed and placed in small vials containing 10% sucrose, ensuring their pedicels were submerged. The vials were inserted in racks that were placed in small air-tight boxes for incubation at 25° C. A thin layer of a glycerol water solution (33% w/w) in each box maintained constant humidity. Flowers were individually inoculated directly in the hypanthium with 10 μL of a $10^5$ CFU/mL suspension of *Erwinia amylovora* in PBS with Tween 20 at 0.1% w/w. Half the flowers were inoculated with a streptomycin resistant strain (1535m5) collected in Oregon, USA, and the other half with a local streptomycin sensitive strain (435s). Both strains proved very aggressive in previous trials. Approximately 30 minutes after inoculation, 10 randomly selected individual flowers of each strain organized in 5 blocks were flooded with 32 μL of each treatment. Treatments consisted of either a F25 VDH2 (1/200) control treatment ("Thymox control" hereinafter) or a Streptomycin 17 (0.6 g/L) standard control. A water control and a non-inoculated control were also included (data not shown). After 72 h of incubation, all flowers were treated with a water suspension of Scala (pyrimethanil, 40% w/w) at a rate of 3 ml/L (i.e. a final concentration of 0.3% v/v) to minimize fungal contamination. A non-parametric scale was used to estimate the disease severity (DS) 7 days after inoculation. DS was rated as follows: 0=absence of necrosis; 1=minute necrosis; 2=ovary partially necrotic; 3=ovary severely necrotic; and 4=necrosis extending into the pedicel. Severity scores excluding streptomycin treated flowers were analyzed with a cumulative link mixed model (clmm) in the "ordinal" package of R(Christensen 2015) using blocks as a random effect. Because of separation, data with streptomycin were analyzed with the "bract" function of the package "brglm2" under R using mean bias reduction (Kosmidis, Pagui, and Sartori 2019). Formulation, concentration, and the interaction with bacterial strain were explored to model treatment efficacy.

Results

Figure 12:
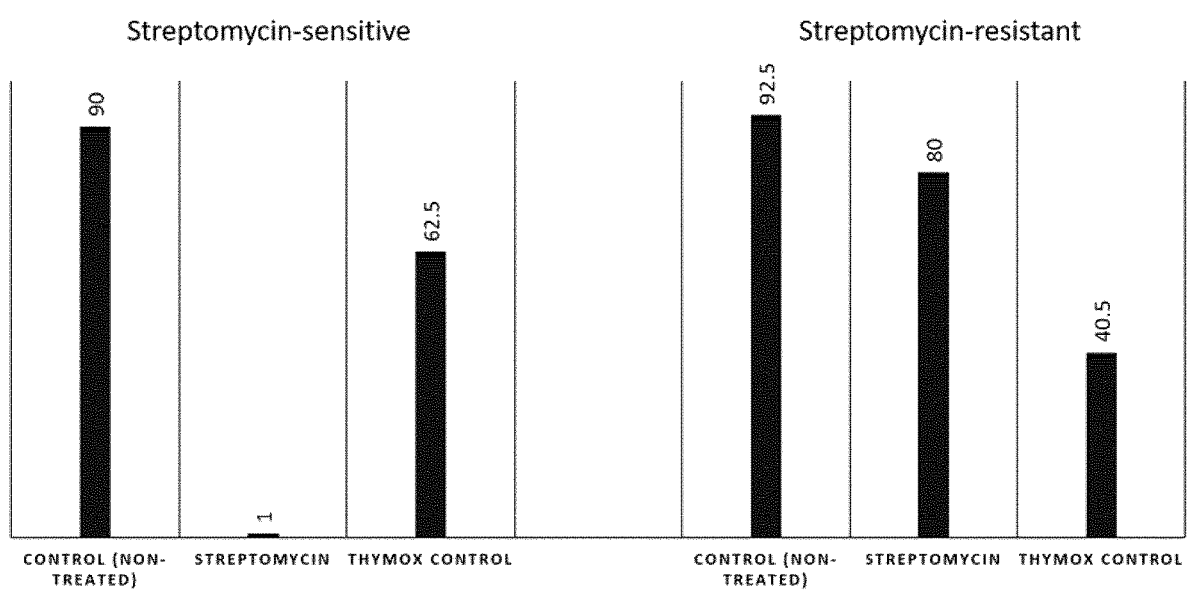
FIG. 12 illustrates the antibacterial efficacy of Thymox™ control treatments on streptomycin-resistant bacteria.

FIG. 12 shows raw data represented as a cumulative bar plot for disease severity. As expected, streptomycin strongly inhibited fire blight on flowers inoculated with a sensitive strain of the bacteria but showed no effect on the resistant strain. No disease was found on the uninoculated controls (not shown). Thymox control treatments reduced disease severity on Streptomycin sensitive plants (27.5% reduction) and surprisingly, strongly reduced disease severity in streptomycin resistant plants (52% reduction). These results demonstrate that when antibiotic resistance issue is a problem to protect plants, Thymox™ control can be used to help plants resist against bacteria.

EXAMPLE 8

Thymox Control Treatment Protects Pears and Apples Against Fireblight

The composition of the present invention (Thymox™ Control) was used in field trials on pears and apples, as presented in Table 14 below.

TABLE 14

| Test parameters and results | | | |
|---|---|---|---|
| Application | Test A | Test B | Test C |
| Crop Type | Pears (Concorde, Cornice) | Apples (Pink Lady) | Pears (Bartlett & Anjou) |
| Dates and Frequency | Jun. 20, 2019, 5:30 AM, 18° C. at time of application and sunny/clear | Jun. 7, 2019, 6 AM, 22° C. | Jun. 4, 2019, 6:30 AM, 22-26° C. |
| Dilution/ Form ULA | 0.5% solution (2 quarts in 100 gallons of water per acre) applied with a handgun to minimize drift | 0.5% v/v/ solution applied with Rears Power Blast with 33" fan | 0.5% solution (2 quarts in 100 gallons of water per acre) applied with Bexar, Assail. Rimon, Agri-Mek & Summer oil-air-o-fan Engine drive airblast sprayer |
| Results | No fireblight observed | No fireblight observed | No fireblight observed |

EXAMPLE 9

Thymox Control Treatment Protects Apple Trees Against Fireblight

The composition of the present invention (Thymox™ Control) was used in field trials on pears and apples, as presented in Table 15 below.

TABLE 15

| Test parameters | | |
|---|---|---|
| Application | Test A | Test B |
| Crop type | Apples (Pink Lady) | Apples (Honeycrisp) |
| Frequency | 4 applications and 1 application Previsto Organic copper every 5 days | |
| Field surface | 1 acre | |
| Dilution/Formulation | Thymox ™ control 0.5% 100 gallons RTU/acre | |

The application stops completely the fire blight strike, which was found to be unexpected as the Pink Lady apple tree is a most susceptible apple variety to fire blight.

EXAMPLE 10

Thymox™ Control Treatment Protects Grapes and Cherries Against Powdery Mildew

The composition of the present invention (Thymox™ Control) was used in field trials on cherries and grapes against powdery mildew, as presented in Table 16 below.

TABLE 16

| Test parameters and results | | |
|---|---|---|
| Application | Test A | Test B |
| Crop type | Cherries | Grapes (Chardonnay) |
| Date and Frequency | Jun. 5, 2019, one application; Airblast 130 gal/acre | June $10^{th}$, July $10^{th}$, July $13^{th}$, 3 Applications |

TABLE 16-continued

Test parameters and results

| Application | Test A | Test B |
|---|---|---|
| Field surface | | 2 acres |
| Weather conditions | Sunny and dry | Warm, dry, light wind |
| Dilution/Formulation | Thymox ™ control 0.5% solution | Thymox control 0.5% solution Tank mix with sulfur |

The cherries did not display any powdery mildew pursuant to application, and unexpectedly, birds, which are normally eating the cherries, we repelled by application of Thymox™ Control. Grapes did display a decreased, but not an elimination of powdery mildew, and co-application of another fungicide would increase pest control.

EXAMPLE 11

Evaluation of the Efficacy of Foliar Application of Thymox Control on Hemp Against Fungal Plant Diseases: Gray Mold (*Botrytis* Spp.) and Powdery Mildew (*Leveillula* sp.)

Materials and Methods

The experiment was conducted in a greenhouse as a randomized complete block design with 6 replications/4 plants per replication. The data was subjected to analysis of variance (ANOVA), and treatment means were separated at 5% level of probability (i.e. $p=0.05$). Plants were inoculated with either *Botrytis* spp. or *Leveillula* sp. Treatments were observed and *Septoria* (*Septoria cannabis*) and Powdery Mildew (*Leveillula taurica*) were evaluated for severity and incidence. Treatments were as following: 1=No treatment; 2=Standard commercial treatment (GreenCure® from GreenCure® Solutions, which contains 85% potassium bicarbonate); and (iii) Thymox control treatment following 3 treatments/30 days, 4 treatments/30 days, 5 treatments/30 days, and 7 treatments/30 days.

Results

Figure 13:
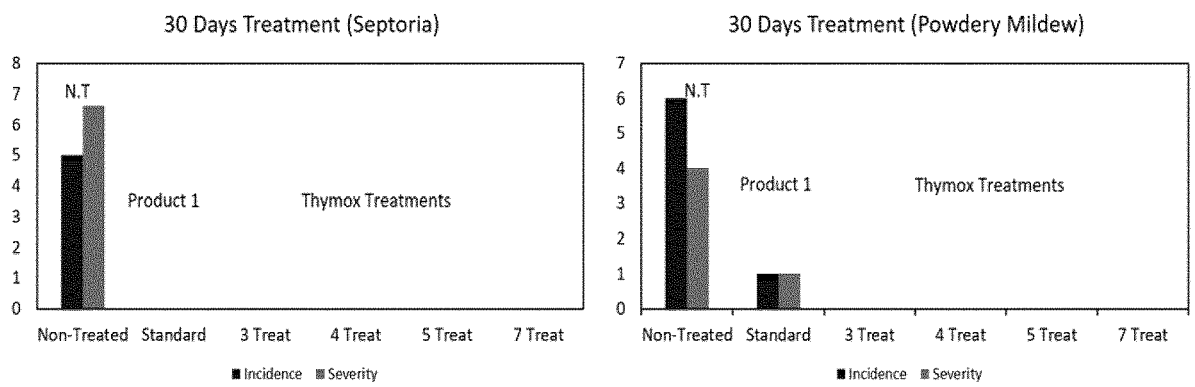
FIG. 13 illustrates the disease-inhibitory properties of Thymox™ control treatments in plants infected with *Septoria* and Powdery Mildew.

Now referring to FIG. 13, it is shown that Thymox™ control treatment completely inhibited disease incidence and disease severity in plants infected with *Septoria* (left hand-side) and Powdery Mildew (right hand-side).

EXAMPLE 12

Thymox™ Control Treatment Significantly Inhibits *Botrytis* on Stevia

Materials and Methods

The *Botrytis*-inhibiting properties of Thymox™ control treatment was assessed on Stevia. Thymox™ control treatment was diluted 1/200 and sprayed (i.e. at a 0.5% v/v rate) on plants contaminated with *Botrytis*. One day after treatment the effect of Thymox™ Control on *Botrytis* was evaluated.

Result

Figure 14:
FIG. 14 illustrates the *Botrytis*-inhibitory properties of Thymox™ control treatments on Stevia.
Figure 14:

Thymox™ control treatment completely inhibits *Botrytis* on Stevia. As shown in FIG. 14, most of the leaves are infected with *Botrytis* (i.e. the prior to treatment condition on the left hand-side of FIG. 14), but 24 hours after treatment *Botrytis*-induced damage to the leaves is completely reversed (i.e. the post-treatment condition on the right hand-side).

EXAMPLE 13

Thymox™ Control is not Phytotoxic to the Plants

The phytotoxicity of the Thymox™ control treatment was assessed. One of the problems associated with the application of essential oil-based formulations is the sensitivity of the plants to these oils in terms of phytotoxicity. In other word, plant leaves may burn and turn yellow or orange because of phytotoxicity of the essential oil formulations, which is not desired by growers and farmers.

Materials and Method

Thymox control treatment was diluted 1/200 and sprayed (i.e. at a 0.5% v/v rate) on different plant species to check for the phytotoxicity.

Result

Figure 15:
FIG. 15 illustrates the absence of phytotoxicity of Thymox™ control treatments on *Artimesia silvermound*.
Figure 15:

As shown in FIG. 15, application of Thymox™ control treatment on *Artimesia silvermound* (i.e. the post-treatment condition on the right hand-side of FIG. 15) does not cause any phytotoxicity as compared to *Artimesia silvermound* after treatment (i.e. the before-treatment condition on the left hand-side of FIG. 15). In fact, the leaves of *Artimesia silvermound* become even healthier and greener after the application of the Thymox™ control treatment compared to the leaves of *Artimesia silvermound* prior to the application.

Figure 16:
FIG. 16 illustrates the absence of phytotoxicity of Thymox™ control treatments on *Artimesia "Powis castle"*.
Figure 16:

Similarly, as shown in FIG. 16, application of Thymox™ control treatment on *Artimesia "Powis Castle"* (i.e. the post-treatment condition on the right hand-side of FIG. 16) does not cause any phytotoxicity as compared to *Artimesia "Powis Castle"* after treatment (i.e. the before-treatment condition on the left hand-side of FIG. 16). In fact, the leaves of *Artimesia "Powis Castle"* become even healthier and greener after the application of the Thymox control treatment compared to the leaves of *Artimesia "Powis Castle"* prior to the application.

EXAMPLE 14

Formulation Comprising Vitamin C

Formulations according to the present inventions may also be formulated including vitamin C (i.e. ascorbic acid or ascorbate). Examples of formulations comprising vitamin C, compared to formulation F25 shown in Table 5 above, are shown in table 17 below.

TABLE 17

Exemplary formulations based on formulation F25, comprising vitamin C.

| Ingredients | F25-VC1 (% w/w) | F25-VC2 (% w/w) | F25 (% w/w) |
|---|---|---|---|
| Thyme oil | 25 | 24 | 27 |
| Isopropanol | 4.5 | 4.5 | 4.3 |
| Butyl Lactate | 16 | 16 | 15.8 |
| Glycerol | 22.5 | 22.5 | 22.5 |

TABLE 17-continued

Exemplary formulations based on formulation F25, comprising vitamin C.

| Ingredients | F25-VC1 (% w/w) | F25-VC2 (% w/w) | F25 (% w/w) |
|---|---|---|---|
| Potassium Sorbate | 18.5 | 18.5 | 18.3 |
| Quillaja | 0.35 | 0.35 | 0.35 |
| Citric Acid | 0.15 | 0.15 | 0.15 |
| Vitamin C | 2 | 3 | 0 |
| $H_2O$ | 11 | 11 | 11.6 |
| Total | 100 | 100 | 100 |

To further assess antibacterial activity of these formulations, they were submitted to a quantitative test that compares the effectiveness of a given nano-emulsion based on its capacity to prevent bacterial colony formation, the so-called Petri-Counted Dry Anti-Microbial test (PAMB). Briefly, the formulations were added to petri dishes inoculated with $10^6$ *Staphylococcus aureus* and the logarithmic reduction in the number of colonies were counted after a 24-hour incubation period, where a higher log reduction represents a higher antibacterial activity.

Figure 17:
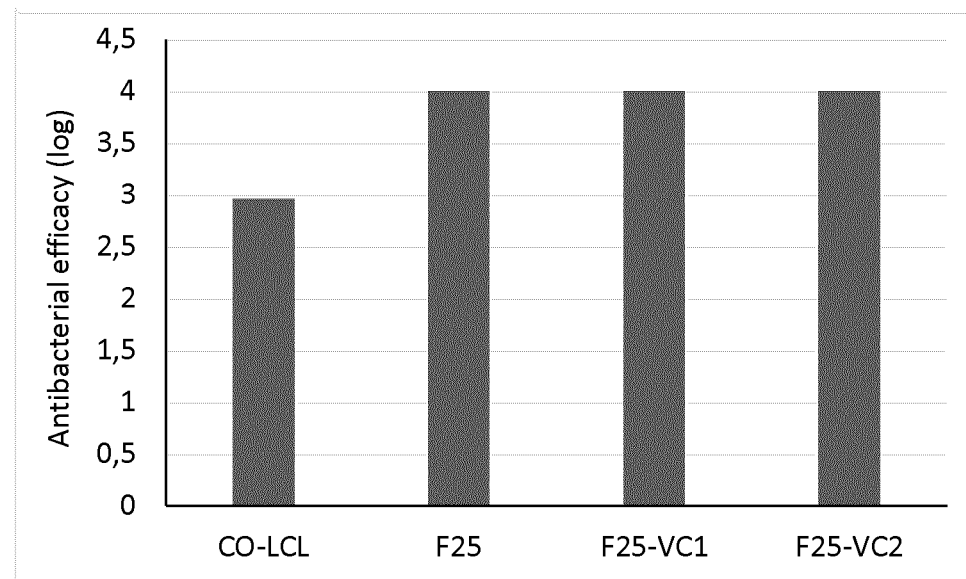
FIG. 17 illustrates the antibacterial activity of formulations of the present invention containing Vitamin C.

Now referring to FIG. 17, there is shown a comparison the formulations of the present invention comprising vitamin C detailed in Table 17 above, compared to the base formulation. The results show that substitution of essential oil (in this case, thyme oil) by vitamin C preserves the antibacterial activity of the formulation.

While preferred embodiments have been described above and illustrated in the accompanying drawings, it will be evident to those skilled in the art that modifications may be made without departing from this disclosure. Such modifications are considered as possible variants comprised in the scope of the disclosure.

REFERENCES

Pusey, P. L. 1997. Crab apple blossoms as a model for research on biological control of fire blight. Phytopathology. 87:1096-1102

Kunz, S., and Haug, P. 2006. Development of a strategy for fire blight control in organic fruit growing. In Ecofruit, Weinsberg/Germany: Fördergemeinschaft Ökologischer Obstbau eV (FÖKO), p. 145-150.

Christensen, R. H. B. 2015. Ordinal-Regression Models for Ordinal Data.

Kosmidis, I., Pagui, E. C. K., and Sartori, N. 2019. Mean and median bias reduction in generalized linear models. arXiv e-prints. arXiv:1804.04085.

The invention claimed is:

1. An aqueous nano-emulsion consisting essentially of thyme oil or rosemary oil; isopropanol; glycerol; butyl lactate; sorbate; Quillaja *saponaria* extract; citric acid and water.

2. A method of disinfecting a surface consisting essentially of applying the aqueous nano emulsion of claim 1 to the surface.

* * * * *